(12) United States Patent
Kanamaru et al.

(10) Patent No.: US 7,823,197 B2
(45) Date of Patent: Oct. 26, 2010

(54) PROGRAM EXECUTION DEVICE AND PROGRAM EXECUTION METHOD

(75) Inventors: Tomokazu Kanamaru, Osaka (JP); Masahiro Oashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 978 days.

(21) Appl. No.: 11/571,098

(22) PCT Filed: Jun. 28, 2005

(86) PCT No.: PCT/JP2005/011792

§ 371 (c)(1),
(2), (4) Date: Dec. 21, 2006

(87) PCT Pub. No.: WO2006/003875

PCT Pub. Date: Jan. 12, 2006

(65) Prior Publication Data

US 2008/0047000 A1 Feb. 21, 2008

(30) Foreign Application Priority Data

Jun. 30, 2004 (JP) ............................... 2004-194889
Oct. 28, 2004 (JP) ............................... 2004-314664

(51) Int. Cl.
*G06F 12/00* (2006.01)
*G06F 12/14* (2006.01)
(52) U.S. Cl. ............................... 726/17; 726/26; 726/27
(58) Field of Classification Search .................... 726/17, 726/26, 27
See application file for complete search history.

(56) References Cited

U.S. PATENT DOCUMENTS

| 5,634,012 A | 5/1997 | Stefik et al. |
| 5,933,498 A | 8/1999 | Schneck et al. |
| 6,202,121 B1 | 3/2001 | Walsh et al. |
| 6,317,742 B1 | 11/2001 | Nagaratnam et al. |
| 6,526,513 B1 | 2/2003 | Shrader et al. |

(Continued)

FOREIGN PATENT DOCUMENTS

| EP | 0715243 | 6/1996 |
| EP | 0853279 | 7/1998 |
| EP | 1480101 A2 * | 11/2004 |
| EP | 1491996 | 12/2004 |
| JP | 2002-511615 | 4/2002 |

(Continued)

OTHER PUBLICATIONS

Flanagan, "Java Quick Reference," 3rd edition, O'Reilly-Japan, Dec. 20, 2000, pp. 230-242, and related English language edition, Flanagan, "Java In a Nutshell, A Desktop Quick Reference," 3$^{rd}$ edition, O'Reilly, Nov. 1999, pp. 168-177.

(Continued)

*Primary Examiner*—Farid Homayounmehr
*Assistant Examiner*—Jason K Gee
(74) *Attorney, Agent, or Firm*—Greenblum & Bernstein, P.L.C.

(57) ABSTRACT

A service program recorded on a portable medium is executed directly or after being installed temporarily in a long-term storage apparatus. A program execution device prevents unrestricted execution of the program when the portable medium is not inserted in the device, from the viewpoint of managing resource access to the device. The program is attached with permission information indicating resource access rights. According to an acquisition route of the program to be executed, first permission information and second permission information indicating different access rights are applied for executing the program.

12 Claims, 14 Drawing Sheets

U.S. PATENT DOCUMENTS

| | | | |
|---|---|---|---|
| 7,051,366 B1 | 5/2006 | Fee et al. | |
| 2001/0037357 A1* | 11/2001 | Anzai et al. | 709/203 |
| 2002/0174224 A1 | 11/2002 | Scheifler et al. | |
| 2003/0041267 A1 | 2/2003 | Fee et al. | |
| 2003/0046578 A1 | 3/2003 | Brown et al. | |
| 2003/0074580 A1 | 4/2003 | Knouse et al. | |
| 2003/0231343 A1 | 12/2003 | Kobayashi et al. | |
| 2004/0083178 A1* | 4/2004 | Tanaka et al. | 705/50 |
| 2005/0160045 A1 | 7/2005 | Watanabe et al. | |
| 2005/0249108 A1 | 11/2005 | Bruekers et al. | |

FOREIGN PATENT DOCUMENTS

| | | |
|---|---|---|
| JP | 2004-46801 | 2/2004 |
| WO | 01/99030 | 12/2001 |
| WO | 03/083646 | 10/2003 |
| WO | 2004/029966 | 4/2004 |

OTHER PUBLICATIONS

English language Abstract of JP 2004-46801.
Oaks, "Java Security," O'Reilly-Japan, May 2000, pp. 69-133, and related English language edition, Oaks, "Java Security," O'Reilly, May 1998, pp. 62-123.
English language Abstract of JP 2002-511615.
English language Abstract of WO 99/53395.
Rosenblatt B et al., "Digital Rights Management, Passage", Jan. 1, 2002, Digital Rights Management: Business and Technology, New York, NY: M&T Books, US, pp. 79-88 95 and 96, XP002341140, ISBN: 978-0-7645-4889-5.

* cited by examiner

FIG. 3

301 PERMISSION INFORMATION TABLE

| RESOURCE TYPE | PARAMETER |
|---|---|
| FILE ACCESS, DEFAULT | "read" |
| SPECIFIED FILE | "access.log","read,write" |
| SPECIFIED FILE | "userpreference","forbidden" |
| PROPERTY | "user name","forbidden" |
| PROPERTY | "java.version","read" |
| SOCKET | "matis:6000","connect" |
| SOCKET | "matis:1024-","accept,listen" |
| URL | "http://sample.com","connect" |
| SERIALIZE | "enable" |
| DISPLAY | "main window","enable" |
| LED lamp | "enable" |
| REMOTE CONTROL | "disenable" |
| POWER CONTROL | "enable" |
| PROGRAM INTERACTION | "control.jar","enable" |
| PROGRAM INTERACTION | "mediamanager","enable" |
| DATA EXPORTING | "high-score","read" |
| DATA EXPORTING | "playername","forbidden" |
| DATA EXPORTING | "snapshot","read,write" |
| ADDITIONAL PROGRAM INFORMATION | "enable" |

FIG. 4

```
<?xml version="1.0"?>
<permissioninfofile id="0x000023d5">

<fileaccessdefault read="true" write="false">
</fileaccessdefault>
<fileaccess read="true" write="true">access.log
</fileaccess>
<fileaccess read="false" write="false">userpreference
</fileaccess>

<property read="false" write="false">user name
</property>
<property read="true" write="false">java.version
</property>

<network>
<host action="connect">matis:6000</host>
<host action="accept">matis:1024</host>
<host action="listen">matis:1024</host>
<URL action="connect">http://sample.com</URL>
</network>

</permissioninfofile>
```

(a) PRE-CONVERSION PERMISSION INFORMATION

```
<?xml version="1.0"?>
<permissioninfofile id="0x000023d5">

<fileaccessdefault read="true" write="false"></fileaccessdefault>
<fileaccess read="true" write="true">access.log</fileaccess>

<property read="false" write="false">user name</property>
<property read="true" write="false">java.version</property>

</permissioninfofile>
```

↓ INPUT

PERMISSION CONVERSION UNIT

↓ OUTPUT (b) POST-CONVERSION PERMISSION INFORMATION

```
<?xml version="1.0"?>
<permissioninfofile id="0x000023d5">

<fileaccessdefault read="true" write="false"></fileaccessdefault>
<fileaccess read="true" write="true">access.log</fileaccess>

<property read="true" write="false">user name</property>
<property read="true" write="false">java.version</property>

<URL action="connect">http://terminalmaker.com</URL>

</permissioninfofile>
```

FIG. 7

114 INSTALLATION INFORMATION TABLE

| PROGRAM | FIRST PERMISSION INFORMATION | SECOND PERMISSION INFORMATION | PROGRAM ID | PORTABLE MEDIUM ID |
|---|---|---|---|---|
| "prog1.jar" | "prog1A.prf", "withdisk" | "prog1B.prf", "nodisk" | "prog1.jar" | 0x00003b0d |
| "game.jar" | "disk.prf", "withdisk" | "diskless.prf", "nodisk" | "data2.j" | 0x0800ebff |
| "control.jar" | "cp_1.prf", "withdisk" | "cp_2.prf", "nodisk" | "data0a0d" | 0x00ac007d |
| ...... | ...... | ...... | ...... | ...... |

711  712  713  714  715

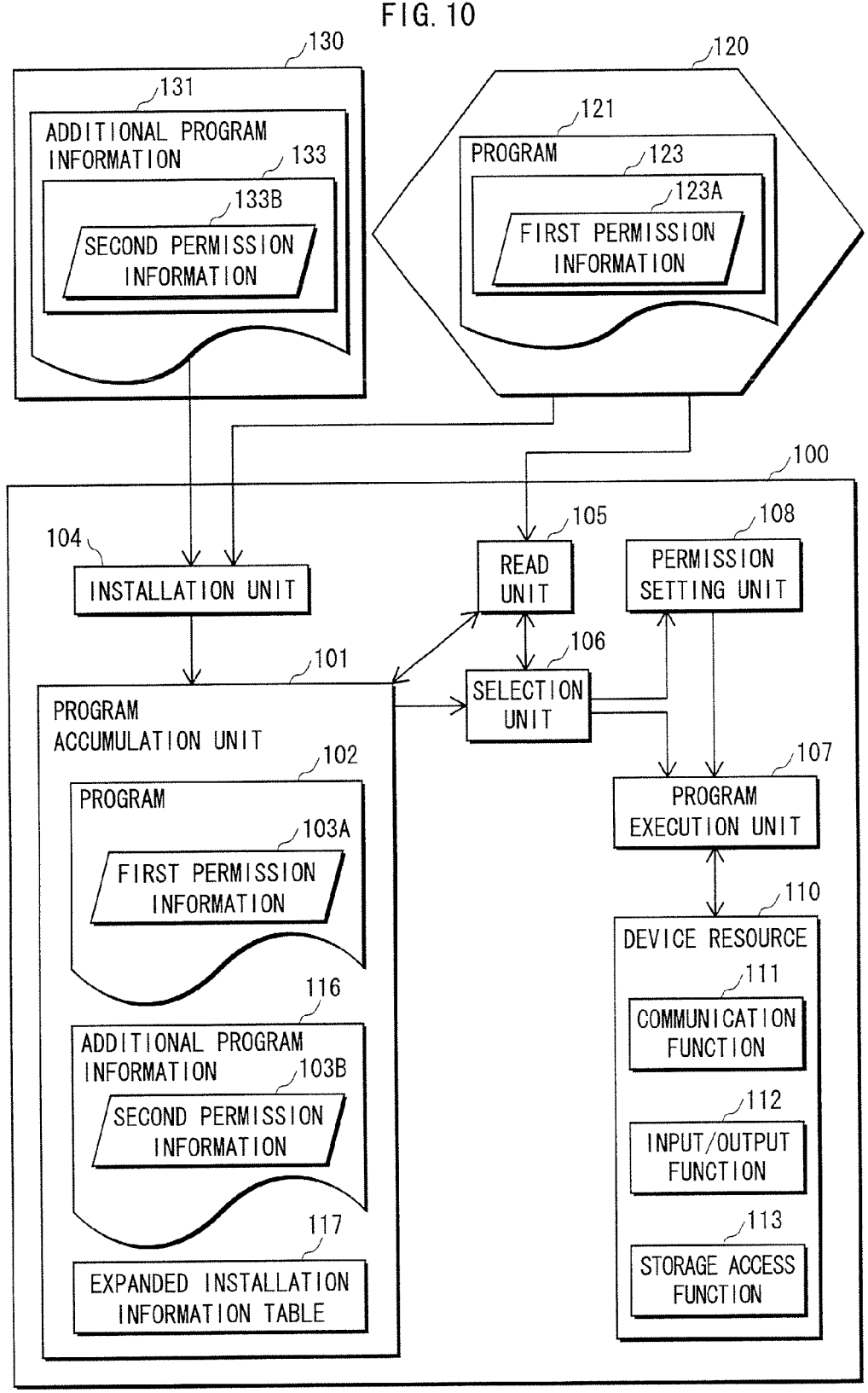

FIG. 11

117 EXPANDED INSTALLATION INFORMATION TABLE

| PROGRAM | FIRST PERMISSION INFORMATION | SECOND PERMISSION INFORMATION | PROGRAM ID | PORTABLE MEDIUM ID | ADDITIONAL PROGRAM INFORMATION | ADDITIONAL PROGRAM INFORMATION ID | DEVICE ID |
|---|---|---|---|---|---|---|---|
| 1171 | 1172 | 1173 | 1174 | 1175 | 1176 | 1177 | 1178 |
| "prog1.jar" | "prog1A.prf", "diskonly" | "prog1B.prf", "addition" | "prog1.jar" | "0x00003b0d" | "update04.jar" | "update04.jar" | server_1034 |
| "game.jar" | "disk.prf", "diskonly" | "diskless.prf", "addition" | "data2.j" | "0x0800ebff" | — | — | — |
| — | — | — | "clockwork" | — | "newly.jar" | "newly" | 19x.16x.1.0 |
| "control.jar" | "cp_1.prf", "diskonly" | "cp_2.prf", "addition" | "data0d" | "0x0a234041" | "update04.jar" | "update04.jar" | "http://xxx/prog1" |
| ... | ... | ... | ... | ... | ... | ... | ... |

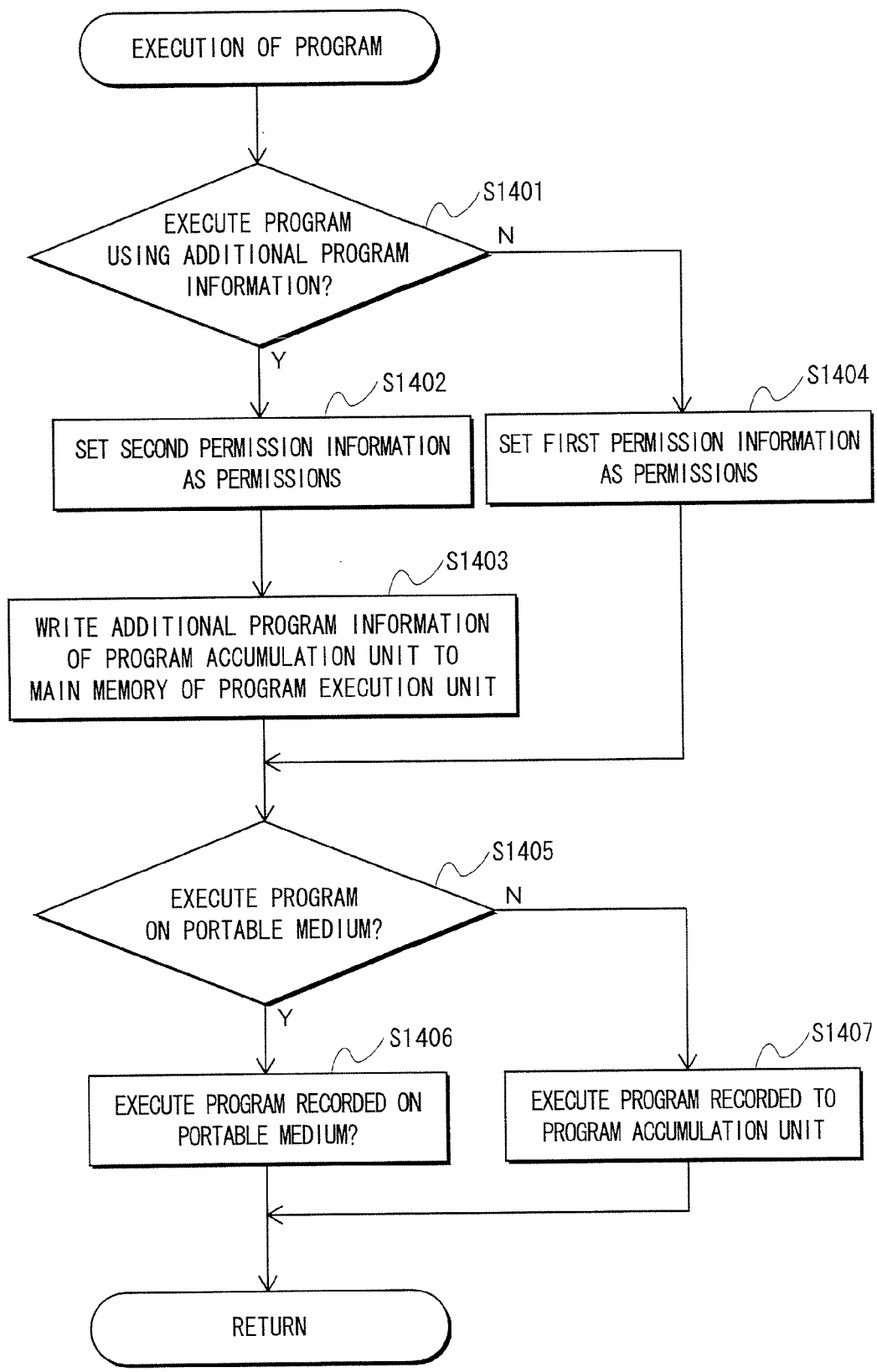

PROGRAM EXECUTION DEVICE AND PROGRAM EXECUTION METHOD

TECHNICAL FIELD

The present invention relates to a program execution device that manages permissions (execution rights or access rights for resources) in a device for executing a program.

BACKGROUND ART

In recent years, a system of adding programs to household electronic devices after shipment, and adding functions to devices by executing these programs has become widespread.

Typical technologies for program execution systems that run programs on household electronic devices include JAVA™ and .NET™.

These technologies include virtual machine systems, and are hoped to become common platforms for the implementation of services due to their ability to run programs without depending on hardware such as a CPU of a network appliance.

A program to be added to a device is often accompanied by permission information that indicates operations the program is permitted to perform. Appropriately setting the permission information prevents the danger of the added program performing arbitrary actions such as tampering with or destroying a user's personal information in the device, or leaking information from the device via a network without permission. In JAVA™ for example, mechanisms such as security managers and accesses controllers are provided to appropriately control the access rights of programs. These mechanisms are disclosed in non-patent document 1.

A typical method of distributing a program to be added to a device involves the use of a network. For example, services that distribute programs by wireless communication for the mobile device to execute are already being implemented in mobile devices such as mobile phones.

Recently, focus has been placed on additional methods that entail distributing programs via portable recording (or storage) media (hereinafter, called simply "portable media"). Here, portable media includes optical discs, silicon devices, memory cards, and other various media that are portable and can record data.

In this case, the household electronic devices have a structure that enables the insertion/removal of the portable medium. There are various embodiments of such insertion/removal depending on the type of the portable medium. In the following description, a state in which the portable medium has been mounted in the device, and the device can read data recorded on the portable medium is referred to as the portable medium having being "inserted" into the device, or the portable medium being "inserted". An otherwise state is referred to as the portable medium having been "removed" from the device, or the portable medium being "removed".

Household electronic devices can execute a program by selecting a method such as directly reading and executing the program from the inserted portable medium, or executing the program after having temporarily copied the program on the portable medium to an independent storage apparatus included in the device.

Among devices with a mechanism for the insertion/removal of a portable medium, there are devices that associate operation of a program with the inserted/removed state of the portable medium in some way. One conventional example is shown in patent document 1.

Also, a technique of performing some sort of processing other than simply copying data when the device copies data of the program from the portable medium is disclosed in, for example, patent document 2.

There are two possible types of embodiments for executing a program recorded on a portable medium in devices with a mechanism for the insertion/removal of portable media.

The first type is a method in which the program execution system of the device directly reads and executes the program recorded on the portable medium. In this case, it is a necessary for the portable medium to be inserted in the device.

The other type is a method in which the program recorded on the portable medium is temporarily copied (installed) to a storage apparatus such as a hard disk in the device, after which the program execution system of the device reads and executes the copied data. In this case, it is not necessary for the actual portable medium to be in an inserted state in the device while the program is being executed.

There is a greatly increased level of freedom for the device user in the latter method since it is not required for the portable medium to be inserted when operating the program.

On the other hand, the latter method is a method that allows a user who has a portable medium and temporarily copies a program thereon to a storage apparatus in the device to freely redistribute (e.g., transfer or sell to another user) the portable medium. As such, it is often not preferable from the viewpoint of the developer or provider of the portable medium to allow a program to be executed by this method.

Patent document 1 discloses a method that allows execution of a program copied to a storage apparatus only if the portable medium on which the program is copied is inserted in the device, and otherwise prohibits execution of the program. In this case, it is necessary for the portable medium to be inserted in the device at all times to operate the program, thereby making it possible to prevent the user from redistributing the portable medium etc., which the developer or provider of the portable medium did not intend.

However, a method that requires the portable medium to be inserted at all times when operating the program causes new problems such as the following.

(1) It is impossible to operate the program if the portable medium is damaged etc.

(2) A user with two or more devices cannot operate the program simultaneously on more than one device.

(3) Even in the case of a user who is executing a program in accordance with an authorized use other than redistribution of the portable medium, it is necessary for the user to insert the portable medium in order to prove that the user has the portable medium in his possession whenever executing the program. This makes the program less user-friendly.

Note that although there are exemplary methods that improve the speed of the program by applying optimization etc. when the device copies the program from the portable medium, in conventional technology, permission information associated with the program (also called an Appli) does not change according to where the program to be executed is recorded, but rather is specified as being substantially unified with the program, and this is not considered to be modified (patent document 2).

Patent document 1: Japanese Patent Application Publication No. 2004-46801

Patent document 2: Published Japanese Translation of PCT Application No. 2002-511615

Non-patent document 1: "JAVA™ Security" by Scott Oaks, pub. O'Reilly, May 2001, ISBN 0-596-00157-6

DISCLOSURE OF THE INVENTION

Problems Solved by the Invention

The present invention aims to provide a program execution device able to set permission information according to an acquisition route of a program provided by a portable medium, when executing the program.

Means to Solve the Problems

In order to solve the above-mentioned problems, the present invention is a program execution device that acquires and executes a program attached with access permission information indicating an access right to a resource during execution of the program, the program execution device including: a permission information setting unit operable to set, according to an acquisition route of the program, first permission information included in the access permission information or second permission information that differs from the first permission information; and an execution unit operable to execute the program in accordance with the first permission information or the second permission information set by the permission information setting unit.

Effects of the Invention

According to a structure such as above, first permission information and second permission information that differs from the first permission information are set according to the acquisition route of the program, thereby enabling permission information in accordance with the use of the program to be applied to the operated program.

Also, the program execution device may further include: a mounting unit operable to have mounted therein a portable recording medium on which the program is recorded; and a program storage unit operable to copy and store the program and the access permission information recorded on the mounted portable recording medium. The permission information setting unit may include a first setting subunit operable to set the first permission information when the program is read from the portable recording medium mounted in the mounting unit; and a second setting subunit operable to set the second permission information when the program is read from the program storage unit.

This structure enables the provision of a service to the user involving applying different permission information to an operated program depending on whether the program recorded on the portable recording medium is directly executed, or the program temporarily copied to the program storage unit for recording programs is executed.

For example, appropriate permission information can be set according to an acquisition route of a program, such as, even when operating the same program, providing a program that operates using full local resources of a device to a user using a device having a portable recording medium mounted therein, and providing a program that operates while part of functions (e.g., network access functions to external devices) have been disabled to a user not using the device having the portable recording medium mounted therein. Using the present invention enables providing a user with a more flexible service embodiment than conventional systems.

The first permission information and the second permission information may be included in the access permission information recorded on the portable recording medium, the first permission information and the second a permission information may be stored along with the program in the program storage unit, the first setting subunit may set the first permission information recorded on the portable recording medium, and the second setting subunit may set the second permission information recorded in the program storage unit.

According to this structure, the two types of permission information can be used directly since they are attached to the program recorded on the portable recording medium.

Also, the first permission information may be included in the access permission information recorded on the portable recording medium, and the program execution device may further include a conversion unit operable to convert the first permission information to the second permission information in accordance with a conversion rule.

According to this structure, the permission information attached to the program recorded on the portable recording medium can be used as is as the first permission information, or the first permission information can be converted and used as second permission information.

Also, the program execution device may further include a detection unit operable to detect the portable recording medium mounted in the mounting unit, the permission information setting unit setting the first permission information regardless of the acquisition route while the detection unit detects the portable recording medium.

According to this structure, if the portable recording medium is mounted, it is possible to execute a program in accordance with the first permission information, regardless of the acquisition route of the program, when the program is executed after having been read from the program storage unit.

The program execution device may further include an acquisition unit operable to acquire additional program information that is associated with the program, the additional program information including the second permission information and an additional program for adding or updating a function of the program, and the permission information setting unit setting the second permission information when the acquisition route is via the acquisition unit.

According to this structure, when additional program information associated with a program recorded on the portable recording medium is acquired by the acquisition unit and an additional program is executed, the program is executed in accordance with second permission information included in the additional program information.

The program execution device may further include: a mounting unit operable to have mounted therein a portable recording medium on which the program is recorded; and a program storage unit operable to copy and store the program and the access permission information recorded on the mounted portable recording medium, the acquisition unit including a download subunit operable to download the additional program information from an external server via a communication line, and an addition unit operable to store the downloaded additional program information in the program storage unit.

According to this structure, a user can easily acquire and use an additional program provided by a program author.

Also, the present invention is a program execution method for a program execution device that acquires and executes a program attached with access permission information indicating an access right to a resource during execution of the program, the program execution method including: a permission information setting step of setting, according to an acquisition route of the program, first permission information included in the access permission information or second permission information that differs from the first permission information; and a program execution step of executing the program in accordance with the first permission information or the second permission information set by the permission information setting unit.

According to this method, permission information that differs according to the acquisition route of the program is applied to a program to be executed.

BRIEF DESCRIPTION OF THE DRAWINGS

FIG. 3 shows exemplary permission information of embodiment 1;

FIG. 4 shows exemplary permission information of embodiment 1;

FIG. 6 shows an exemplary permission modification policy of a program accumulation unit of embodiment 1;

FIG. 7 shows an exemplary installation information table in the program accumulation unit of embodiment 1;

FIG. 10 shows a structure of embodiment 3 of the program execution device pertaining to the present invention;

FIG. 11 shows an exemplary expanded installation information table in a program accumulation unit of embodiment 3;

FIG. 14 shows execution processing of the program of embodiment 3.

Figure 1:
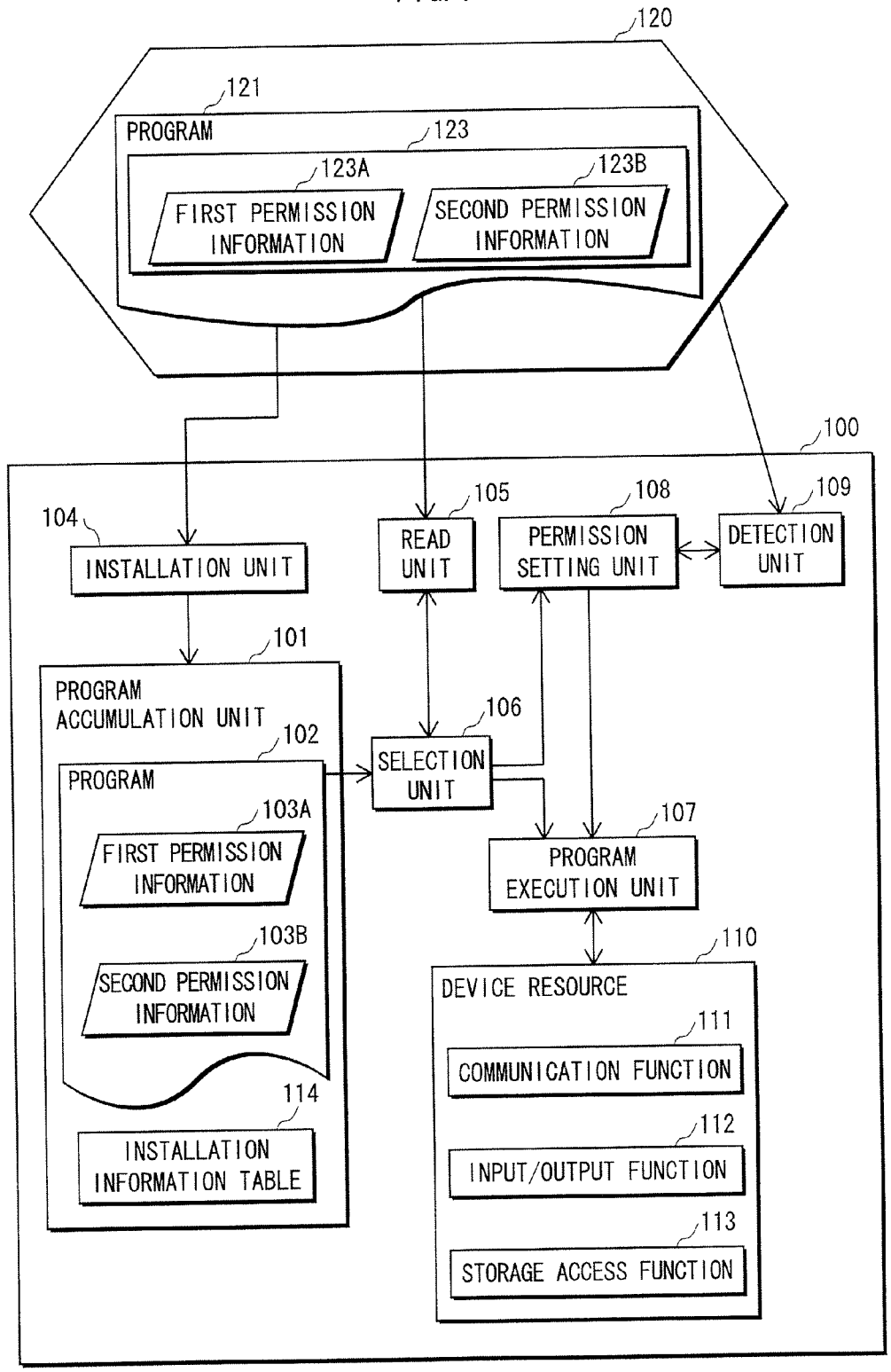
FIG. 1 shows a structure of embodiment 1 of a program execution device pertaining to the present invention.

DESCRIPTION OF THE CHARACTERS 100 program execution device
101 program accumulation unit
102 program (in the program accumulation unit)
103A first permission information (in the program accumulation unit)
103B second permission information (in the program accumulation unit)
104 installation unit
105 read unit
106 selection unit
107 program execution unit
108 permission setting unit
109 detection unit
110 device resource
114 installation information table
115 permission conversion unit
117 expanded installation information table
120 portable medium
121 program (on the portable medium)
123 permission information (on the portable medium)
123A first permission information (on the portable medium)
123B second permission information (on the portable medium)
130 device providing additional program information
131 additional program information
133 permission information (in the additional program information)
133B second permission information (in the additional program information)
301 permission information table
401 XML-formatted permission information

BEST MODE FOR CARRYING OUT THE INVENTION

A program execution device of the present invention has a mounting unit for the mounting of a portable medium, is a device that reads and executes a recorded program, and includes a program execution unit for that purpose. The device of the present invention also includes a program accumulation unit that copies and accumulates a program recorded on the portable medium.

The program execution unit handles the execution of a program according to the following two types of uses (program acquisition routes).

(Execution method A) Directly read and execute the program using only the program data recorded on the portable medium.

(Execution method B) Read and execute program data recorded to the program accumulation unit.

Here, program data refers to an execution format of the program. For example, in the case of a JAVA™ program, data refers to a JAVA™ class file, a JAR file which is a class file in an archived format, and the like.

The following describes differences between the execution methods A and B in further detail.

The storage apparatus (storage unit) included in the program accumulation unit referred to in execution method B is a long-term storage apparatus (non-volatile storage system) such as a hard disk or nonvolatile memory that retains recorded content even if a power supply to the device is disconnected. A short-term storage apparatus (volatile storage system), such as volatile RAM (Random Access Memory) in which recorded content is erased when the power supply is interrupted, is not intended to be used as the storage apparatus included in the program accumulation unit.

In the case of executing a program using execution method A, most methods involve a program recorded on a portable medium being read directly to a short-term storage apparatus, such as RAM, of the device and directly executed, but as mentioned above, the short-term storage apparatus in this case does not mean the program accumulation unit. Execution method A is therefore clearly different from execution method B.

Also, in recent years it has become possible to acquire programs or data that update or add functions to even a program recorded on a portable medium, by downloading such programs or data from a network etc. and storing the downloaded programs or data in the execution device. Such programs and data are called additional program information.

Execution method B corresponds to a case of additional program information being stored in the long-term storage apparatus and used when executing a program.

Execution method A is a method in which execution is performed using only program data recorded on a portable medium, without using any program data stored in the long-term storage apparatus.

Hereinafter, "program accumulation unit" means, as mentioned above, a unit that realizes the recording of data by a long-term storage apparatus, such as a hard disk or nonvolatile memory.

A program recorded on a portable medium is attached with permission information that describes a range of uses permitted to the program.

When executing the program, the program execution unit reads the permission information attached thereto, and reflects the permission information in operations during program execution. At this time, the program execution unit executes the program using different permission information depending on the type of utilization. Specifically, the program execution unit executes the program using first permission information if executing the program by execution method A, and using second permission information if executing the program by execution method B.

The following three types of systems are assumed when preparing permission information that differs according to program acquisition routes.

(a) Two types of permission information corresponding to execution methods A and B are attached to the program recorded on the portable medium.

(b) When copying the program recorded on the portable medium in order to perform execution thereof by execution method B, the device rewrites the first permission information to generate the second permission information.

The aforementioned copying of the program recorded on the portable medium is an operation in which, if the permission information used when executing the program recorded on the portable medium is practically the same as the permission information used when executing the program accumulated in the program accumulation unit, the program recorded on the portable medium is accumulated in the program accumulation unit such that execution using the program recorded in the portable medium and using the program accumulated in the program accumulation unit realize the same functions.

In this case, accumulating part of the program recorded on the portable medium is also called copying if uniformity of the aforementioned permission information is guaranteed when accumulating this part of the program to the program accumulation unit.

Specific examples of such copying include accumulating, in the program accumulation unit, a file the same as a file included in the program on the portable medium, accumulating compressed data of the program on the portable medium (note that in this case it is necessary to have restored the compressed file before executing the program accumulated in the program accumulation unit), accumulating expanded data of compressed program data on the portable medium, and the like.

(c) The device acquires, by downloading, program information associated with the program recorded on the portable medium, and acquires second permission information included in the additional program information.

Using any of the following systems enables the execution of a program using permission information that differs according to the program acquisition route.

Furthermore, the device of the present invention determines whether the portable medium storing the program is inserted into the device when executing the program by execution method B.

(Execution method B-1) The program data recorded in the program accumulation unit is read and executed, where the portable medium is inserted in the device.

(Execution method B-2) The program data recorded in the program accumulation unit is read and executed, where the portable medium is not inserted in the device.

The device of the present invention distinguishes between these utilizations, and executes the program using different permission information according to the utilization.

Embodiment 1

Figure 2:
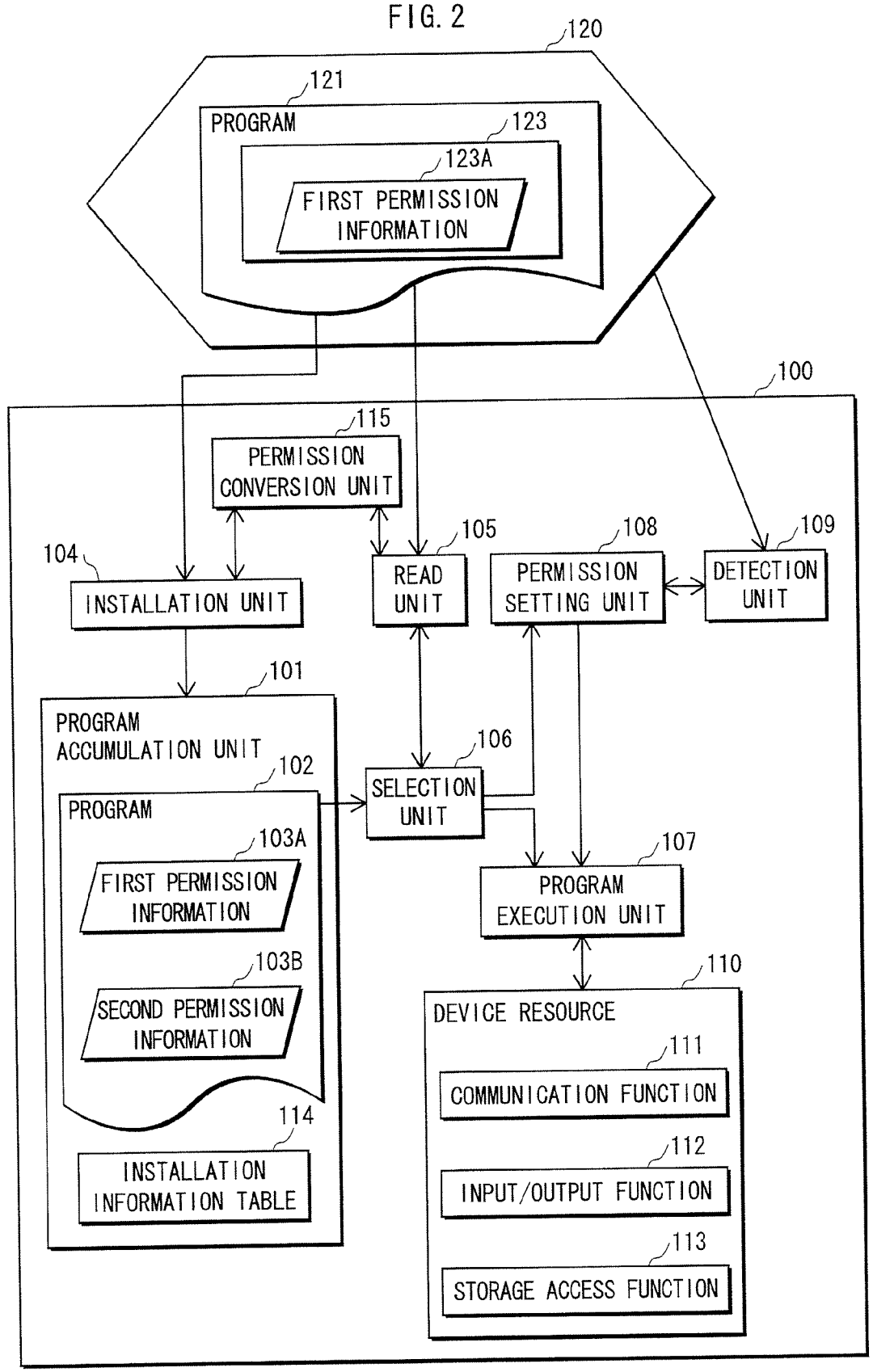
FIG. 2 shows a structure of a variation of embodiment 1.

FIG. 1 shows a structure of a program execution device 100 of embodiment 1 pertaining to the present invention. FIG. 2 shows a structure of a variation of embodiment 1, wherein the same constituent elements have been given the same reference characters.

The program execution device 100 (hereinafter, simply called the "device 1001") includes a mounting mechanism (not depicted) that enables the insertion/removal of a portable medium 120. FIG. 1 shows a case in which the portable medium 120 includes a program attached with two permission information pieces, that is, first permission information and second permission information, and FIG. 2 shows a case in which the program on the portable medium 120 is attached with one permission information piece, that is, only first permission information.

Note that although the programs and permission information in FIG. 1 and FIG. 2 are different, the same numbers have been given to each for the sake of convenience in the description.

The portable medium 120 has recorded thereon a program 121. Any type of portable medium 120 and any mounting mechanism for insertion and extraction (insertion/removal) of the portable medium 120 to/from the device may be used, provided that the device 100 can read data, such as the program, recorded on the portable medium 120.

Here, the portable medium includes an optical disc, a memory card, a silicon device, and various other media that can record data. For example, in the case of a storage device such as a memory card, the device includes a special-purpose port, and insertion/removal of the portable medium into/from the device is realized by directly inserting or removing the portable medium into/from the special-purpose port. In the case of another portable medium such as an optical disc, insertion/removal of the portable medium into/from the device is realized by including a disc loading mechanism using a tray etc., and an optical disc reading (pick-up) apparatus.

The following describes an exemplary case in which the program 121 is written in the JAVA™ execution format, and the program execution unit 107 is realized by a JAVA™ virtual machine. Of course, the program 121 may be written in another format, as long as it is executable by the later-mentioned program execution unit 107. For example, the program may be written in the .NET™ execution format and the program execution unit 107 may be a .NET™ virtual machine. Alternatively, the program may be machine-dependent native code, and the program execution unit 107 may be a processor and a main memory (main storage) included in the device.

The JAR recording format is specified as a format for recording a JAVA™ program and a file storing accompanying meta information etc. as a single file. In the present exemplary embodiment, the program is recorded on the portable medium 120 in the JAR format.

Although more than one program 121 may be recorded on the portable medium 120, there is only one recorded program 121 here for the sake of convenience in the description.

The program 121 recorded on the portable medium 120 is attached with a program ID, which is an identification symbol for the program, and permission information 123.

The following is a specific description of the permission information and operations that are specified thereby and permitted to the program.

The permission information is information indicating a range of behaviors permitted to a program in a device, that is, access execution rights for device resources.

Descriptions of permissions for individual device resources are called permission items, one or more of which are described in a table format or language format and stored in a file called a permission file.

First permission information 123A and second permission information 123B, as well as first permission information 103A and second permission information 103B of a program accumulation unit 101, which are shown in FIG. 1 and FIG. 2, are each constituted from one or more permission files.

The content of the permission items depends on what kinds of functions are available in the device executing the program. For example, the following are specific permission items in the case of an apparatus that plays back a high-density recording medium, typified by a DVD (Digital Versatile Disc) or a BD (Blu-ray Disc).

(Permission item ex.1) Whether the program may access the long-term storage apparatus (storage) of the device to perform reading or writing.

(Permission item ex.2) Whether the program may access a specified file in the device to perform reading or writing.

(Permission item ex.3) Whether the program may access specified information in the device to perform reading or writing. Here, specified information refers to, for example, the time of a clock, scheduled recording information, a channel setting, personal information such as the device user's name, and various settings such as a use history of the device.

(Permission item ex.4) Whether the program may access other content (e.g., video etc. recorded on the portable medium 120) to perform reading or writing.

(Permission item ex.5) Whether the program may use a network function of the device to perform communication.

(Permission item ex.6) Whether the program may use a specified protocol.

(Permission item ex.7) Whether the program may perform communication with a specified counterpart (e.g., a website specified by a URL).

(Permission item ex. 8) Whether the program may perform a specified execution process. Examples include thread operations, serializing, deserializing, and reflection.

(Permission item ex.9) Whether the program may use an output apparatus of the device to perform some kind of output. Examples of the output resource include a display, a specified window, a sound source, an LED lamp, and a vibrator.

(Permission item ex.10) Whether the program may receive input from an input resource of the device. Examples of the input resource include a power switch, various types of switches, a tuner, a remote control, a joy stick, and a touch panel.

(Permission item ex. 11) Whether the program may perform communication with another program.

(Permission item ex.12) Whether the program may control the execution of another program. Examples of control include starting, temporarily stopping, and ending execution.

(Permission item ex.13) Whether data used by or generated by the program may be accessed by another program for reading or writing.

(Permission item ex.14) Whether data used by or generated by the program may be taken from or exported out of the device. Examples include the data being recorded to and taken away on the portable medium 120, and being transmitted.

(Permission item ex.15) Whether the program may use additional program information. Specifically, whether the program may use data or a program that has been acquired via a medium other than the portable medium 120 (e.g., by downloading via a network) and is for updating or adding a function of the program.

FIG. 3 shows exemplary permission information in a table format, and the following describes, based on FIG. 3, actual examples of types of information specified by the permission information.

The permission items in a permission information table 301 specify two particulars, which are resource types and parameters. A resource type 311 indicates a type of behavior (device resource to be accessed) permitted by the permission, and a parameter 312 indicates a range of the permission regarding a respective resource. The entries of the permission items indicate permissions such as the following, in correspondence with the indicated characters.

(301A) Indicates reference and update permissions to all files or a specified file in the device.

(301B) Indicates reference and update permissions to the device and various properties of the device.

(301C) Indicates use permissions for a network function (such as using a network socket or port number, using a specified communication protocol, or access to a specified counterpart).

(301D) Indicates use permissions for a specified operation (a thread operation, serializing, deserializing, reflection, etc.) in program execution.

(301E) Indicates use permissions for an output resource (a display, specified window, sound source, LED lamp, vibrator, etc.) of the device.

(301F) Indicates use permissions for an input resource (a power switch, various switches, a tuner, a remote control a joy stick, a touch panel, etc.) of the device.

(301G) Indicates permissions for whether the program may perform communication with another program.

(301H) Indicates permissions for whether data used by or generated by the program may be exported to another device.

(301I) Indicates a permission for whether the program may use additional program information.

The permission information describes whether use of the aforementioned resources is permitted during execution of the program, and if use is permitted, information regarding limitations (to what extent an operation is permitted) is recorded in the permission information. The types of permissions indicated by the permission information may be the types mentioned above, or of course may be other types.

The recording format of the permission information may be any format that can be read when the program execution system executes the program. For example, a "JAVA™ POLICY" file may be set as a format for recording permissions for a JAVA™ program. Another format may be used as long as similar information is described therein.

FIG. 4 shows exemplary permission information written in XML language format.

For example, in XML-formatted permission information 401 in FIG. 4, both reading of (read) and writing to (write) the property "user name" 411, which is one type of device resource, are disabled (false).

Next is a description of constituent units of the device 100, with reference to FIG. 1 and FIG. 2.

The device 100 of the present embodiment includes a program accumulation unit 101, a read unit 105, an installation unit 104, a selection unit 106, a program execution unit 107, a permission setting unit 108, a detection unit 109, and a device resource 110. Note that a variation of the present embodiment further includes a permission conversion unit 115.

The program accumulation unit 101 copies, using the installation unit 104, and stores the program recorded on the portable medium 120. The program accumulation unit 101 can be realized by a long-term storage apparatus such as a hard disk or nonvolatile memory that retains recorded content even if the power supply of the device is disconnected.

In the structure shown in FIG. 1, the program 121 recorded on the portable medium 120 and all of the permission information 123 attached thereto have been copied to the program accumulation unit 101 of the device.

In the structure shown in FIG. 2, the program 121 recorded on the portable medium 120 is copied as is to the program accumulation unit 101 by the installation unit 104. Regarding the permission information 123 recorded on the portable medium 120, the first permission information 123A is copied as is to the program accumulation unit 101 by the installation unit 104. In the process of being recorded to the program accumulation unit 101, or in the process of being used by the program execution unit 107 after having been accumulated in the program accumulation unit 101, the first permission information 123A is converted by the permission conversion unit 115 and recorded in the program accumulation unit 101 as the second permission information 103B.

The program execution unit 107 executes a program (121 or 102). If the program is written in JAVA™, program execution can be realized by using a JAVA™ virtual machine.

The installation unit 104 installs the program 121 and permission information 123A from the portable medium 120. The installation unit 104 also reads a storage medium ID of the portable medium 120, a program ID of the program 121, and a file name of the first permission information 123A, and records the read data to an installation information table 114 which is described later, for managing the installed content.

Furthermore, the installation unit 104 installs the second permission information 123B if it exists as shown in FIG. 1, and if the second permission information 123B does not exist, as shown in FIG. 2, the installation unit 104 transmits the first permission information 123A to the permission conversion unit 115, and instructs conversion of the first permission information 123A to generate second permission information. The installation unit 104 also receives the second permission information generated by the permission conversion unit 115, and installs the received second permission information to the program accumulation unit 101.

The read unit 105 reads the storage medium ID of the portable medium 120, the program 121 and program ID thereof, and the first permission information 123A, further reads the second permission information 123D if it exists as shown in FIG. 1, and transmits the read data to the selection unit 106.

Also, if the second permission information 123B does not exist, as shown in FIG. 2, the read unit 105 transmits the first permission information 123A to the permission conversion unit 115, and instructs conversion of the first permission information 123A to generate second permission information. The read unit 105 also receives the second permission information generated by the permission conversion unit 115, and transmits the received second permission information to the selection unit 106.

The selection unit 106 questions a user whether to execute the program 102 installed to the program accumulation unit 101, or the program 121 recorded on the portable medium 120, and in the former case, reads the program 102 installed to the program accumulation unit 101, and writes the program 102 to a main memory (not depicted) of the program execution unit 107.

At the same time, the selection unit 106 reads the first and second permission information of the read program from the program accumulation unit 101, reads the storage medium ID of the portable medium 120 and the program ID from the later-mentioned installation information table 114, and notifies the read data to the permission setting unit 108.

Also, in the latter case, the selection unit 106 instructs the read unit 105 to read data from the portable medium 120. The selection unit 106 receives the program recorded on the portable medium 120 from the read unit 105, and writes the received program to the main memory.

Similarly, the selection unit 106 receives, from the read unit 105, the storage medium ID of the portable medium 120, as well as the program ID and first and second permission information of the program written to the main memory, and transmits the received data to the permission setting unit 108.

Here, the selection unit 106 obtains the storage medium ID from the entry in a storage medium ID field 715 in the installation information table 114 when the program is in the program accumulation unit 101, or from the read unit 105 when the program is on the portable medium 120.

Note that the selection unit 106 uses a display apparatus (not depicted) and a keyboard or mouse (not depicted) when questioning the user. Note that there may be a defined default selection in the case of not explicitly questioning the user. In other words, by setting the device in advance, the present embodiment may omit questioning the user which of the two programs to execute.

The program execution unit 107 analyzes the permission information attached to the program, and appropriately controls execution of the program. The JAVA™ virtual machine is provided with mechanisms called a security manager and an access controller, as a system for this purpose.

The JAVA™ virtual machine analyzes permission information attached to a JAVA™ program, and loads the program into the virtual machine using a system called a secure loader. As a result of this procedure, the security manager and access controller appropriately control the execution of the program such that the behavior of the program while being executed stays within the permissible range indicated by the permission information. Details of this system are disclosed in nonpatent document 1.

The permission setting unit 108 is realized by the JAVA™ virtual machine, and sets the permission information of the program to be executed by the program execution unit 107. The permission setting unit 108 receives, from the selection unit 106, the storage medium ID of the portable medium 120 storing the program to be executed, as well as the program ID and first and second permission information of the program to be executed, and appropriately sets, for the program to be executed, either the first or second permission information in the main memory (not depicted) of the program execution unit 108.

The permission setting unit 108 sets the first permission information when the program to be executed is read from the portable medium 120. Also, even if the program to be executed is read from the program accumulation unit 101, the permission setting unit 108 sets the first permission information when the portable medium 120 storing the program to be executed is in the inserted state. Otherwise, the permission setting unit 108 sets the second permission information.

In order to find out whether the portable medium 120 storing the program to be executed is inserted, the permission setting unit 108 transmits the storage medium ID of the portable medium 120 and the program ID to the detection unit 109, and instructs the detection unit 109 to judge whether the portable medium 120 is inserted in the mounting mechanism (not depicted).

If the inserted or removed state is found to have changed based on the judgment by the detection unit 109, the permission setting unit 108 changes the setting to either the first or second permission information.

The detection unit 109 receives the storage medium ID and the program ID from the permission setting unit 108, and when the portable medium 120 is inserted in the device, judges whether the received storage medium ID and program ID match the storage medium ID of the inserted portable medium 120 and the program ID of the program recorded thereon, and notifies the permission setting unit 108 of the inserted state when there is a match. When there is not a match, the detection unit 109 notifies the permission setting unit 108 that the appropriate portable medium is not inserted (has been removed).

The detection unit 109 can be realized by a sensing apparatus of the portable medium 120, as well as a system for reading data from the portable medium 120 and a software program that accesses the data reading system.

The device resource 110 is realized as a function to access data stored within the device, one of various types of device functions that are accessible by the program execution unit 107 executing the program, or the like. If the program execution unit 107 is realized as a JAVA™ virtual machine, access to the device resource 110 can be realized by the inclusion of various types of JAVA™ libraries that are called upon by the JAVA™ program.

The device resource 110 includes a communication function 111, an input/output function 112, and a storage access function 113, or of course other functions.

If only the first permission information is attached to the program 121 on the portable medium 120, then in accordance with an instruction from the installation unit 104 or the selection unit 106, the permission conversion unit 115 converts the first permission information to generate second permission information, records the second permission information to the program accumulation unit 101, and records a file name thereof in a second permission information field 713 of the program 121 in the installation information table 114.

The permission conversion unit 115 can be realized by, for example, a definition of a rule for modifying the permission information 123 (a permission modification policy), and a software program that, in accordance with the defined rule, modifies the input permission information to generate new permission information. Details of the permission conversion unit 115 are described later. Note that from the viewpoint of security, it is desirable for the permission information accumulated in the program accumulation unit 101 to be stored in a tamper-resistant manner such that it is not stolen or altered by a means other than the apparatus of the present invention.

The following describes operations performed in the present embodiment.

Figure 5B:
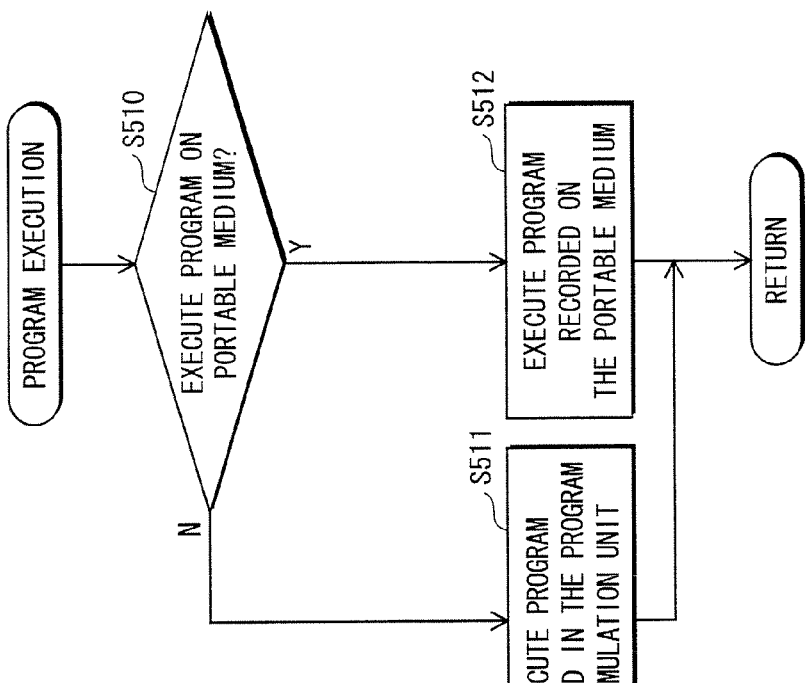
FIGS. 5A and 5B show installation processing and execution processing of a program of embodiment 1.
Figure 5A:
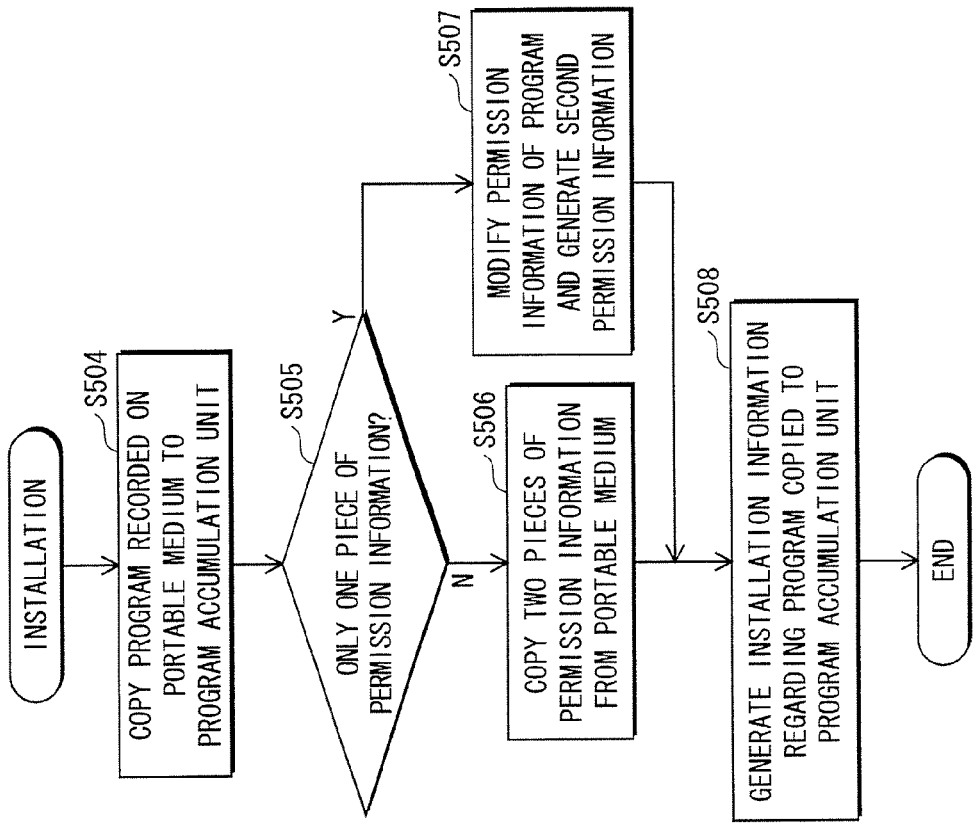

FIGS. 5A and 5B show installation processing and execution processing of the program respectively.

First is a description of installation operations, with reference with FIG. 5A.

Installation is executed by the installation unit 104 when the portable medium 120 is inserted into the device 100 and there has been an installation instruction from the user. Installation can be realized by, for example, questioning the user using the device 100 whether to install the program to the device 100, and obtaining a result regarding the answer. Alternatively, installation may be realized by a method other than questioning the user, such as providing the installation unit 104 with information regarding the available capacity of the long-term storage apparatus in the device, and automatically performing copy processing if there is enough available capacity to accumulate the program.

The installation unit 104 copies, to the program accumulation unit 101, the program 121 recorded on the portable medium 120 inserted into the device 100 (S504).

The program accumulation unit 101 holds information regarding the usable capacity of the long-term storage apparatus of the device. For example, installation is not possible and processing ends if there is a problem in the execution of the copy processing, such as an insufficient amount of available capacity in the long-term storage apparatus.

Note that if the portable medium 120 is rewritable, the program may be erased from the portable medium 120 as the program copy processing is being performed (i.e., the program is moved).

In S505, the installation unit 104 judges whether to modify the permission information attached to the program targeted for copying, when the program is accumulated in the program accumulation unit 101.

The installation unit 104 judges in the negative if, as shown in FIG. 1, the program recorded on the recording medium is attached with not only first permission information to be used when the program is directly executed, but also second permission information to be used when the program is executed after having been temporarily installed to the device, and processing moves to S506. On the other hand, if the program recorded on the recording medium is as shown in FIG. 2, it is necessary for the permission conversion unit 115 to newly generate second permission information for when the program is executed after having been copied to the device. The timing of the generation processing can be realized by either of the following two cases.

(Case 1) The second permission information is generated during the process of copying the program from the portable medium 120 to the program accumulation unit 101.

(Case 2) The second permission information is generated when the program recorded to the program accumulation unit 101 is executed by the program execution unit 107. Here, the first permission information must be in the program accumulation unit 101.

Although either of the cases is applicable, case 1 is used in the present embodiment, and processing moves to S507.

Note that in a variation of the present embodiment, processing moves to S506 without the permission conversion unit 115 performing conversion processing, when case 2 is used.

In S506, processing is performed to copy the permission information of the program recorded on the portable medium 120 to the program accumulation unit 101.

The program accumulation unit 101 holds information regarding the usable capacity of the long-term storage apparatus of the device. If there is a problem in the execution of the copy processing, such as an insufficient available capacity of the long-term storage apparatus, S506 may be stopped, and the program recorded on the portable medium 120 may be directly executed by the program execution unit 107 (S503 may be performed).

In S507, the installation unit 104 instructs the permission conversion unit 115 to convert the permission information of the program recorded on the portable medium 120 to newly generate second permission information. The installation unit 104 receives the generated second permission information from the permission conversation unit 115, and records the received second permission information to the program accumulation unit 101 as well as records an ID or file name thereof in the second permission information field 713 of the installation information table 114.

The permission conversion unit 115 can be implemented as, for example, a software program that reads pre-conversion permission information and outputs permission information that has been rewritten according to a predetermined rule.

FIG. 6 shows an example of conversion by the permission conversion unit 115. In FIG. 6, (a) is an example of the pre-conversion permission information, that is, the permission information attached to the program recorded on the portable medium 120. FIG. 6 shows an example of information in the XML format.

The following defines four exemplary rules defined by a permission modification policy in this example.

(1) A "read" right is permitted while a "write" right is not permitted, as default access rights to all files in the device.

(2) The "read" right is permitted while the "write" right is not permitted, as access rights to a "user name" property of the device.

(3) Regarding the network function, a "connect" right is permitted for access to a URL "http://terminalmaker.com".

(4) No modifications are to be made regarding permission information other than the above three rules.

The permission conversion unit 115 reads the permission information shown in (a) of FIG. 6, and generates new permission information in accordance with the above-described rules. In FIG. 6, (b) is an example of new permission information generated in S507.

In this processing, the post-conversion second permission information is recorded in the program accumulation unit 101.

The processing of S508 is performed after the program and permission information have been copied to the program accumulation unit 101. In S508, the installation unit 104 creates management information regarding the copied program. Such information is referred to as installation information in the present embodiment.

FIG. 7 shows exemplary installation information. In FIG. 7, the installation information is recorded in a table format in an installation information table 701. When a program is copied to the program accumulation unit 101, the program is added as a new entry to the installation information table.

The installation information table 701 is constituted from item fields, which are a program field 711, a first permission information field 712, a second permission information field 713, a program ID field 714, and a portable medium ID field 715.

Information for specifying the targeted program is recorded in the program field 711. Such information is, for example, a file name in a file system of the program accumulation unit 101.

Information for specifying permission information associated with the program is recorded in the first permission information field 712 and the second permission information field 713. Such information is, for example, a permission file name in the file system of the program accumulation unit 101.

The first permission information field 712 includes a file name of permission information to be used when acquiring and executing a program from a portable medium, and when acquiring a program installed to the program accumulation unit 101 and executing the installed program while the portable medium is mounted. Also, the second permission information field 713 includes a file name of permission information to be used when acquiring a program installed to the program accumulation unit 101 and executing the installed program while the portable medium has been removed.

There are two pieces (two types) of permission information, first and second, for one program.

Permission file names (more than one may be specified) that identify permission information are recorded in the first permission information field 712 and the second permission information field 713.

In other words, the identification information "prog1A.prf" and "withdisk" are recorded in the first permission information field 712 to be used when performing execution while the portable medium 120 has been inserted, and the identification information "prog1A.prf" and "nodisk" are recorded in the second permission information field 713 to be used when performing execution while the portable medium 120 has not been inserted.

Identification information for identifying the program recorded on the copy-source portable medium 120 is recorded in the program ID field 714. Such identifying information is, for example, a file name that identifies the program on the portable medium 120. Although how the program ID information is used is described later, the program ID information need not exist depending on the implemented embodiment.

Identification information for identifying the copy-source portable medium 120 is recorded in the portable medium ID field 715. Such identification information is, for example, a serial number individually held by the portable medium 120. Although how the portable medium ID information is used is described later, the portable medium ID information need not exist depending on the implemented embodiment.

Next is a description of operations performed when executing the program, with reference to FIG. 5B.

The selection unit 106 questions the user whether to execute the program installed to the program accumulation unit 101 or the program recorded on the portable medium 120 (S510), and in the former case, writes, to the main memory of the selection unit 106, the program installed to the program accumulation unit 101, and after the permission setting unit 108 has set the second permission information 103B in the main memory, the program execution unit 107 executes the program (S511).

Also, in the latter case, the selection unit 106 writes the program recorded on the portable medium 120 to the main memory of the selection unit 106 with use of the read unit 105, and after the permission setting unit 108 has set the first permission information 123A in the main memory, the program execution unit 107 executes the program (S512).

At this time, information regarding which permission information is to be selected may be recorded on the portable medium 120, or may be determined in the device by an appropriate rule (e.g., recorded information first in an order of data on the portable medium 120 is selected).

Figure 8:
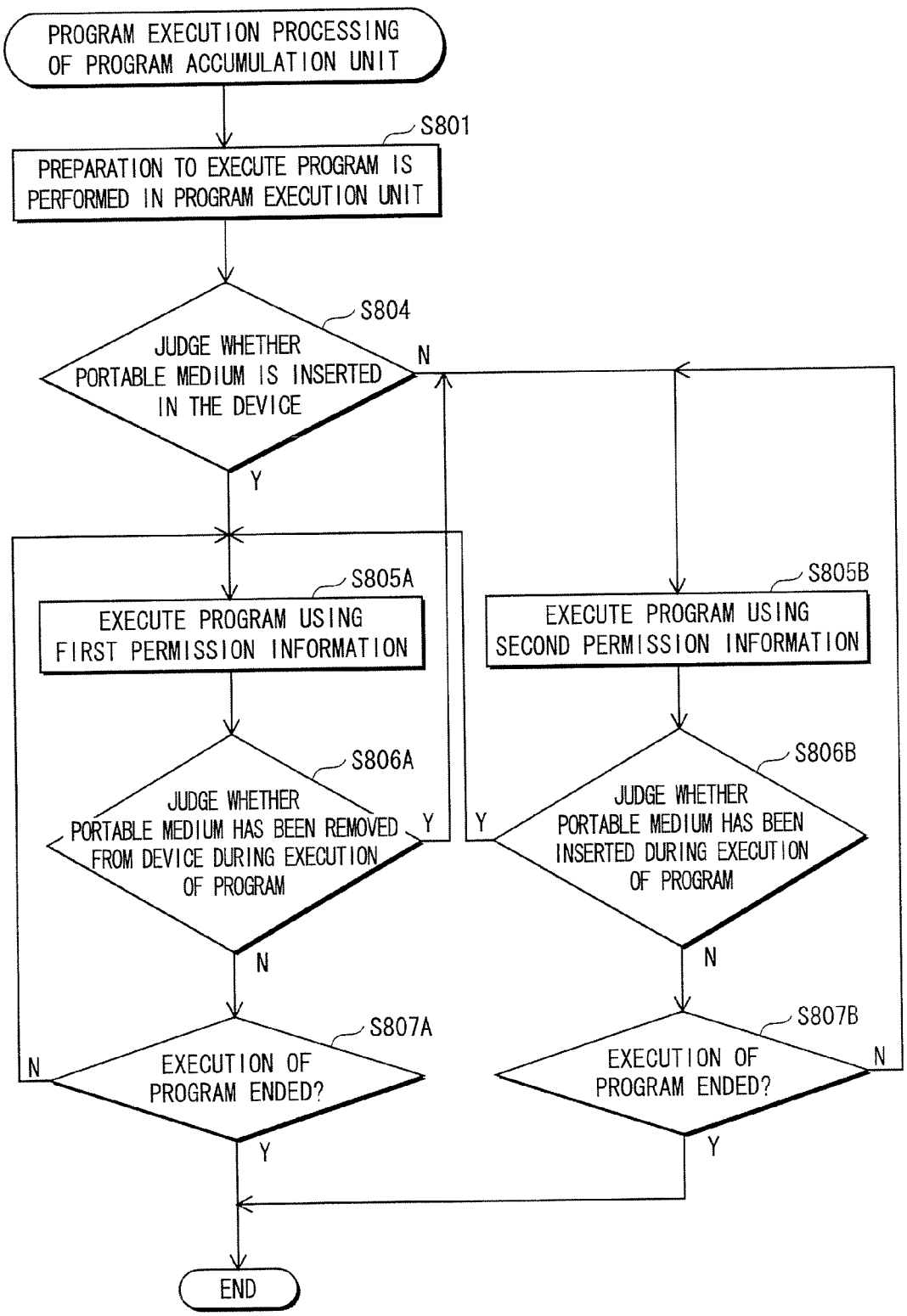
FIG. 8 shows a flow of processing in a case of executing a program recorded in the program accumulation unit of embodiment 1.

FIG. 8 shows details of processing (S511) in the case of executing the program recorded in the program accumulation unit 101.

In the case of executing the program 102 recorded in the program accumulation unit 101, in the present embodiment, whether the portable medium from which the program was copied is inserted in the device is judged, and based on the judgment, a change in the inserted or removed state since the previous judgment is detected. The following are two types of judgment processing regarding a timing of the judgment.

(Timing 1) Whether the portable medium 120 is inserted is judged directly after execution of the program is commenced.

(Timing 2) Whether the portable medium 120 is inserted is judged periodically during execution of the program.

Either of these two types of judgment processing may be performed, or both may be performed. The processing flow of FIG. 8 assumes the case of performing both types of judgment processing.

First, the program execution unit 107 commences execution of the program recorded in the program accumulation unit 101. Here, if the program execution unit 107 is realized by a JAVA™ virtual machine, initialization of the virtual machine is performed to commence the execution of the program (S801).

Whether the portable medium 120 is inserted is judged after commencing execution of the program (S804), as mentioned in (Timing 1).

The detection unit 109 performs this judging.

Figure 9:
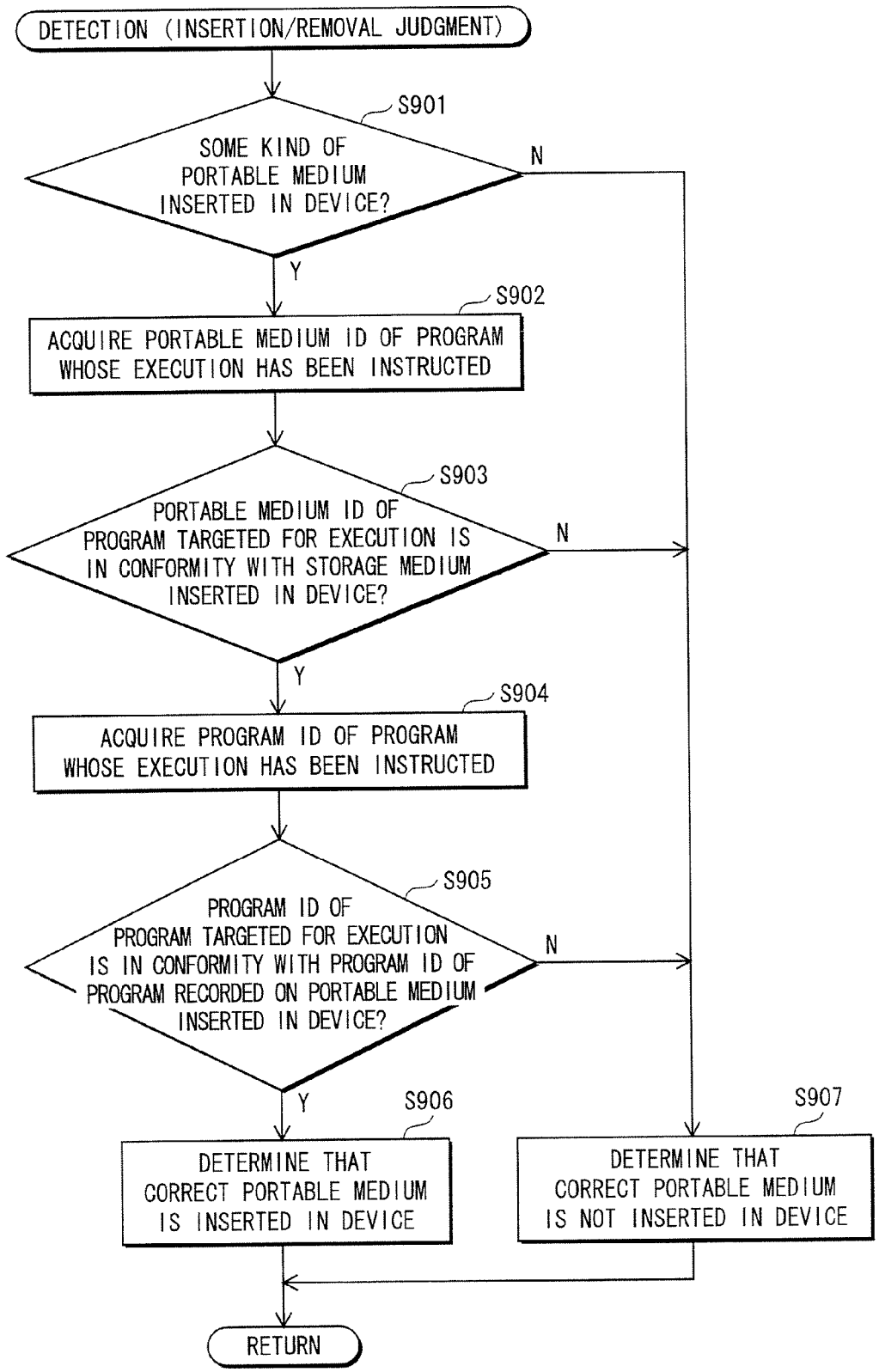
FIG. 9 shows a flow of detection (insertion/removal) processing for a portable storage medium of embodiment 1.

The detection unit 109 not only judges whether simply some type of portable medium 120 is inserted, but also identifies the type of the portable medium 120, and judges whether the "correct" portable medium 120 is inserted according to the program being executed. The following describes a processing flow for judging the inserted or removed state of the portable medium 120, which is shown in FIG. 9.

First, the detection unit 109 judges whether simply some type of portable medium 120 has been inserted into the device 100 (S901). Processing moves to S902 if it has been judged that the portable medium 120 has been inserted, and to S907 if the portable medium 120 has not been inserted in to the device 100.

The detection unit 109 acquires the ID of the portable medium 120 pertaining to the program instructed to be executed by the program execution unit 107. The ID can be acquired by referencing the storage medium ID field 715 in the installation information table 114 of the program accumulation unit 101 (S902), as previously mentioned.

The detection unit 109 reads the recorded content of the inserted portable medium 120 to acquire the ID thereof, and checks for uniformity with the ID of the portable medium 120 pertaining to the program targeted for execution, which was acquired in S902 (S903). Specifically, uniformity of the portable medium 120 IDs can be checked using, for example, a serial number individually held by the portable medium 120. Other information may of course be used as long as it is information that enables checking for uniformity between the portable medium 120, from which the program recorded in the program accumulation unit 101 was recorded, and the inserted portable medium 120.

Processing moves to S904 if uniformity is confirmed, and to S907 if not confirmed.

The detection unit 109 acquires, from the permission setting unit 108, the program ID of the program instructed to be executed by the program execution unit 107 (S904).

The detection unit 109 reads the recorded content of the inserted portable medium 120, acquires the recorded program ID, and checks for uniformity with the program ID of the program targeted for execution, which was acquired in S904 (S905). Specifically, uniformity of the program IDs can be checked using, for example, a file name identifying the program on the portable medium. Rather than program IDs, any information may of course be used as long as it enables checking for uniformity between the program recorded in the program accumulation unit 101, and the program recorded on the portable medium 120 that has been inserted into the device.

Processing moves to S904 if uniformity is confirmed, and to S907 if not confirmed.

The correct portable medium 120 is judged to have been inserted into the device if processing reaches S906. Also, the correct portable medium 120 is judged to not be inserted (to have been removed) if processing reaches S907.

Although judgment is performed using two types of information, which are the portable medium ID and the program ID, in the present embodiment, simply one of the two types may be used. Also, even if the two types of information are used, the correct portable medium may be judged to have been inserted as long as one of the two types of information is in conformity.

Returning again to FIG. 8, the aforementioned detection unit 109 judges whether the "correct" portable medium 120 has been inserted into the device 100 in S804. Processing moves to S805A if the portable medium 120 is judged to be inserted, and otherwise moves to S805B.

If the "correct" portable medium 120 is judged to be inserted in the device 100, or if the correct portable medium 120 is judged to be inserted into the device in S806B, the permission setting unit 108 sets the first permission information which is, for example, a first permission information file (or files) identified by the identification information "with-disk" in the installation information table 114 shown in FIG. 7, and the program is executed by the program execution unit 107 (S805A).

The detection unit 109 detects whether the portable medium 120 has been removed during program execution (S806A) The permission setting unit 108 receives an instruction from the program execution unit 107, and questions the detection unit 109 whether the "correct" portable medium is inserted in the device 100. The processing flow for judging the inserted or removed state of the portable medium is the same as shown in FIG. 9.

If the correct portable medium 120 is judged to not be inserted in (have been removed from) the device, processing moves to S805B since there has been a change from the inserted state to the removed state. Also, if the correct portable medium 120 is judged to be inserted in the device, execution of the program is continued as is, using the first permission information selected in S805A, since there has not been a change in state.

End judgment regarding the program execution is performed (S807A). Specific cases of the program ending include ending execution of the program after processing has ended, and the user stopping execution of the program. Processing returns to S805A if execution of the program is continued.

If the "correct" portable medium 120 is judged to not be inserted in the device 100 in S804, or if the portable medium 120 is judged in S806A to be removed during execution of the program, the permission setting unit 108 switches the permission setting to the second permission information (S805B).

Similarly to during S806A, the detection unit 109 judges whether the portable medium 120 has been inserted during execution of the program (S806B), as described in the above Timing 2. Processing moves to S805A if the correct portable medium 120 is judged to be inserted in the device 100.

If the correct portable medium 120 is determined to not be inserted in the device, execution of the program continues using the second permission information selected in S805B.

End judgment regarding the program execution is performed (S807B), the same as in S807A. If execution of the program is continued, processing returns to S805B.

Embodiment 2

A structure of embodiment 2 is the same as the structure of embodiment 1.

The following describes a program of the present embodiment.

The program may be, but should not be limited to, an application program such as a game that can receive user input to be played.

The program is permitted in the first permission information to use, for example, the following two function items.

(Permission item 1) Reading and writing of data (e.g., data regarding score information during game play) from/to the long-term storage apparatus (storage) of the device is permitted.

(Permission item 2) A network access function for accessing a URL of a server site managed by the game application developer.

If executed by execution method B, the program is prohibited in the second permission information from using the above two permission items.

The program can be executed by an optical disc playback device that includes a program execution environment (i.e., includes the program execution apparatus of the present embodiment), or may be an optical disc recording/playback device that includes a recording function.

If executed based on the first permission information, the program can register a high-score record of the game and the name of the user who played the game, by using the function shown in the permission item 1. Also, by using the function shown in the permission item 2, a URL of a server site can be accessed to download new game-related data, such as data for additional characters to appear in the game or data for additional game stages, and the game can be played using the new data.

If executed based on the second permission information, the program does not register the high-score record of the game or the name of the user who played the game since the function shown in the permission item 1 cannot be used. Similarly, the new game-related data cannot be acquired via a network since the function shown in the permission item 2 cannot be used.

In this case, the program of the game application includes code specifying read and write processing of data from/to the long-term storage apparatus (storage) of the device and code specifying network access processing with respect to a URL of a server site, but the program execution unit 107 disables such processing based on the second permission information when executing the program.

If processing is disabled, such processing content is not implemented, and subsequent processing described in the program is executed. For example, if the program of the game application is written in JAVA™, and the program execution unit 107 is a JAVA™ virtual machine, the JAVA™ virtual machine does not implement read and write processing of data from/to the long-term storage apparatus (storage), which is described in the program. In the same way, the JAVA™ virtual machine does not implement network access processing to access a URL of a server site. Instead, the JAVA™ virtual machine issues exception occurrence information (an exception) indicating that processing in the description has been disabled. Subsequent processing described in the program is then executed.

Embodiment 3

FIG. 10 shows a structure of a program execution device 100 of embodiment 3.

The program execution device 100 (hereinafter, simply called the "device 100") includes a mounting mechanism that enables the insertion/removal of a portable medium 120.

FIG. 10 shows a case in which a program on the portable medium 120 has one piece of permission information attached, that is, only first permission information.

The program and first permission information in FIG. 10 have been given the same numbers as the program and first permission information shown in FIG. 1 and FIG. 2, for the sake of convenience in the description.

The portable medium 120 has recorded thereon a program 121. Any type of portable medium 120 and any mounting mechanism for insertion and extraction (insertion/removal) of the portable medium 120 to/from the device may be used, provided that the device 100 can read data, such as the program, recorded on the portable medium 120.

Here, the portable medium includes an optical disc, a memory card, a silicon device, and various other media that can record data. For example, in the case of a storage device such as a memory card, the device includes a special-purpose port, and insertion/removal of the portable medium into/from the device is realized by directly inserting or removing the portable medium into/from the special-purpose port. In the case of another portable medium such as an optical disc, insertion/removal of the portable medium into/from the device is realized by including a disc loading mechanism using a tray etc., and an optical disc reading (pick-up) apparatus.

The device 100 further includes a mechanism able to connect to a device 130 that provides additional program information (hereinafter, referred to as the device 130), and acquire data stored in the device 130. The device 130 is a server device that is communication-linked with the device 100. The device 130 also has the ability to record data, and any type of device 130, any connection, and any implementation of data communication may be used as long as the device 100 can read data, such as a program, recorded in the device 130. The device 130 may be an optical disc, a memory card, a silicon device, or another type of portable medium that can record data.

The device 130 has recorded thereon additional program information 131. The additional program information 131 includes information showing a relationship with the program 121 or a program 102, such as program ID information for the program 121. The additional program information 131 further includes second permission information to be attached to the program 121.

Beside the aforementioned information, the additional program information 131 may include data for updating or adding function of the program 121. Such data may include a new program that updates a portion or an entirety of the program 121. Alternatively, the additional program information 131 may include media data such as an image, meta data describing information, documents, etc., or other types of data used when the program 121 is executed in the device 100.

In the present embodiment, the additional program information 131 includes a new program to replace part of the program 121. Writing the additional program information 131 to the main memory (not depicted) of the program execution unit 107 along with the corresponding program (the program 121 or 102) enables the execution of a program including updated or added functions. At this time, it is not necessary for all portions of the corresponding program to be written to the main memory (not depicted) since only part of the corresponding program is replaced with the additional program information, but rather, portions considered necessary for the program execution unit 107 may be selectively written.

The following describes an exemplary case in which the program 121 is written in the JAVA™ execution format, and the program execution unit 107 is realized by a JAVA™ virtual machine. Of course, the program 121 may be written in another format, as long as it is executable by the later-mentioned program execution unit 107. For example, the program may be written in the .NET™ execution format and the program execution unit 107 may be a .NET™ virtual machine. Alternatively, the program may be machine-dependent native code, and the program execution unit 107 may be a processor and a main memory (main storage) included in the device.

The JAR recording format is specified as a format for recording a JAVA™ program and a file storing accompanying meta information etc. as a single file. In the present embodiment, the program is recorded on the portable medium 120 in the JAR format.

Although more than one program 121 may be recorded on the portable medium 120, there is only one recorded program 121 here for the sake of convenience in the description.

Also, the additional program information 131 is assumed to include a new program, with improved functions, that updates the program 121. Here, the additional program information is assumed to be recorded in the device 130 in the same JAR format, as a working example.

The program 121 recorded on the portable medium 120 is attached with a program ID, which is an identification number for the program, and permission information 123.

Also, the additional program information 131 recorded on the device 130 is attached with an additional program information ID, which is an identification number for the additional program information, and permission information 133.

Descriptions of the permission information and operations permitted to the program which it specifies have been omitted since they are the same as described in the aforementioned embodiments. FIG. 3 shows exemplary permission information in a table format, and FIG. 4 shows an example of permission information written in the XML language format. Descriptions thereof have been omitted since they are the same as described in the aforementioned embodiments.

The following describes units constituting the device 100, with reference to FIG. 10.

The device 100 of the present embodiment is constituted from a program accumulation unit 101, a read unit 105, an installation unit 104, a selection unit 106, a program execution unit 107, a permission setting unit 108, and a device resource 110.

The program accumulation unit 101 copies, using the installation 104, and stores the program recorded on the portable medium 120 and the additional program information recorded on the device 130. The program accumulation unit 101 can be realized by a long-term storage apparatus such as a hard disk or nonvolatile memory that retains recorded content even if the power supply of the device is disconnected.

In the structure shown in FIG. 10, the program 121 recorded on the portable medium 120 and the permission information 123 attached thereto have been copied to the program accumulation unit 101 of the device 100. The additional information 131 recorded on the device 130 and the permission information 133 attached thereto have also been copied to the program accumulation unit 101 of the device 100.

The program execution unit 107 executes the program 121. The program execution unit 107 also executes the additional program information 131 if it is included in the program. If the program is written in JAVA™, program execution can be realized by using a JAVA™ virtual machine.

The installation unit 104 installs the program 121 and permission information 123A from the portable medium 120. Specifically, the installation unit 104 reads a storage medium ID of the portable medium 120, the program 121, a program ID of the program 121, and the first permission information 123A, copies the read data to the program accumulation unit 101, and records a file name of the copied program to an entry in an expanded installation information table 117 which is described later.

The installation unit 104 also installs the additional program information 131 that includes second permission information 133B, if the additional program information 131 exists on the device 130. Specifically, the installation unit 104 reads a device ID, which is information for identifying the device 130, the additional program information 131, an additional program information ID thereof, and the second permission information 133B to be given to the program 121, copies the read data to the program accumulation unit 101, and records the acquisition-source device ID etc. of the copied additional program information in entries in the later-described expanded installation information table 117, in association with the file name etc. of the program 121.

The read unit 105 reads the storage medium ID of the portable medium 120, the program 121 and program ID thereof, and the first permission information 123A, and transmits the read data to the selection unit 106.

The read unit 105 also refers to the program accumulation unit 101 to check whether there is the additional program information 131 associated with the program 121 and whether the second permission information 103B is stored. If the second permission information 103B is stored, the read unit 105 receives the second permission information and transmits it to the selection unit 106.

The selection unit 106 questions a user of the device regarding the following two selections, and makes a selection regarding either of the selections.

(Selection 1) Execute the program 102 installed in the program accumulation unit 101, or the program 121 recorded on the portable medium 120?

(Selection 2) Execute the program using the additional program information 116?

The selection unit 106 uses a display apparatus (not depicted) and a keyboard or mouse (not depicted) when questioning the user.

Note that the selection unit 106 may not explicitly question the user. Either of the selections may be predefined in the device 100 as a default. In the present embodiment, processing to question the user to make a choice regarding either of the selections may be omitted, and there may be included another means for switching between the selections.

One exemplary implementation of the means for switching between the selections without questioning the user is a method of causing the program executed by the program execution unit 107 to perform switching. Specifically, the selection unit 106 may be implemented as an API (Application Programming Interface) for performing switching between the selections and which can be called on by the program.

The following first describes operations performed in a case of the former option of selection 1 being selected. In this case, the selection unit 106 writes the program 102, which was installed in the program accumulation unit 101, to the main memory (not depicted) of the program execution unit 107. At the same time, the selection unit 106 reads the program ID of the program 102 from the later-described expanded installation information 117, and notifies the read program ID along with a selection result of selection 2 to the permission setting unit 108.

Here, if execution of the program 102 using the additional program information 116 has been specified in selection 2, the selection unit 106 also writes the additional program information 116 to the main memory (not depicted) of the program execution unit 107. As noted in the previous description of the additional program information 131, it is not necessary for all of the information of the program 102 to be written to the main memory (not depicted), but rather, portions considered necessary for the program execution unit 107 may be selectively written.

If it has been specified in selection 2 to not execute the program 102 using the additional program information 116, the selection unit 106 does not write the additional program information 116 to the program execution unit 107.

Next is a description of operations performed in a case of the latter option of selection 1 being selected. In this case, the selection unit 106 instructs the read unit 105 to read the program 121 from the portable medium 120. The selection unit 106 receives the program 121 recorded on the portable medium 120 from the read unit 105, and writes the received program 121 to the main memory (not depicted) of the program execution unit 107. At the same time, the selection unit 106 reads the program ID of the program 121, and notifies the read program ID along with the selection result of selection 2 to the permission setting unit 108.

Here, if execution of the program 121 using the additional program information 116 has been specified in selection 2, the selection unit 106 writes the additional program information 116 as well to the main memory (not depicted) of the program execution unit 107. As noted in the previous description of the additional program information 131, it is not necessary for all of the information of the program 121 to be written to the main memory (not depicted), but rather, portions considered necessary for the program execution unit 107 may be selectively written.

If it is specified in selection 2 to not execute the program 121 using the additional program information 116, the selection unit 106 does not write the additional program information 116 to the program execution unit 107.

The program execution unit 107 analyzes the permission information attached to the program, and appropriately controls execution of the program. The JAVA™ virtual machine is provided with mechanisms called a security manager and an access controller, as a system for this purpose.

The JAVA™ virtual machine analyzes permission information attached to a JAVA™ program, and loads the program into the virtual machine using a system called a secure loader. As a result of this procedure, the security manager and access controller appropriately control the execution of the program such that the behavior of the program while being executed stays within the permissible range indicated by the permission information. Details of this system are disclosed in non-patent document 1.

The permission setting unit 108 is realized by the JAVA™ virtual machine, and sets the permission information of the program to be executed by the program execution unit 107. The permission setting unit 108 receives, from the selection unit 106, the program ID of the program to be executed as well as the selection result information of selection 2 performed by the selection unit 106.

The permission setting unit 108 sets the second permission information included in the additional program information 116, if it is selected in selection 2 to execute the program using the additional program information 116. Otherwise, that is, if it is selected in selection 2 to not execute the program using the additional program information 116, the permission setting unit 108 sets the first permission information attached to the program to be executed.

The device resource 110 is realized as a function to access data stored within the device, one of various types of device functions that are accessible by the program execution unit 107 executing the program, or the like. If the program execution unit 107 is realized as a JAVA™ virtual machine, access to the device resource 110 can be realized by the inclusion of various types of JAVA™ libraries that are called upon by the JAVA™ program.

The device resource 110 may include a communication function 111, an input/output function 112, a storage access function 113, or of course another function.

Note that from the viewpoint of security, it is desirable for the permission information accumulated in the program accumulation unit 101 to be stored in a tamper-resistant manner such that it is not stolen or altered by a means other than the apparatus of the present invention.

Next is a description of operations performed in the present embodiment.

Figure 12:
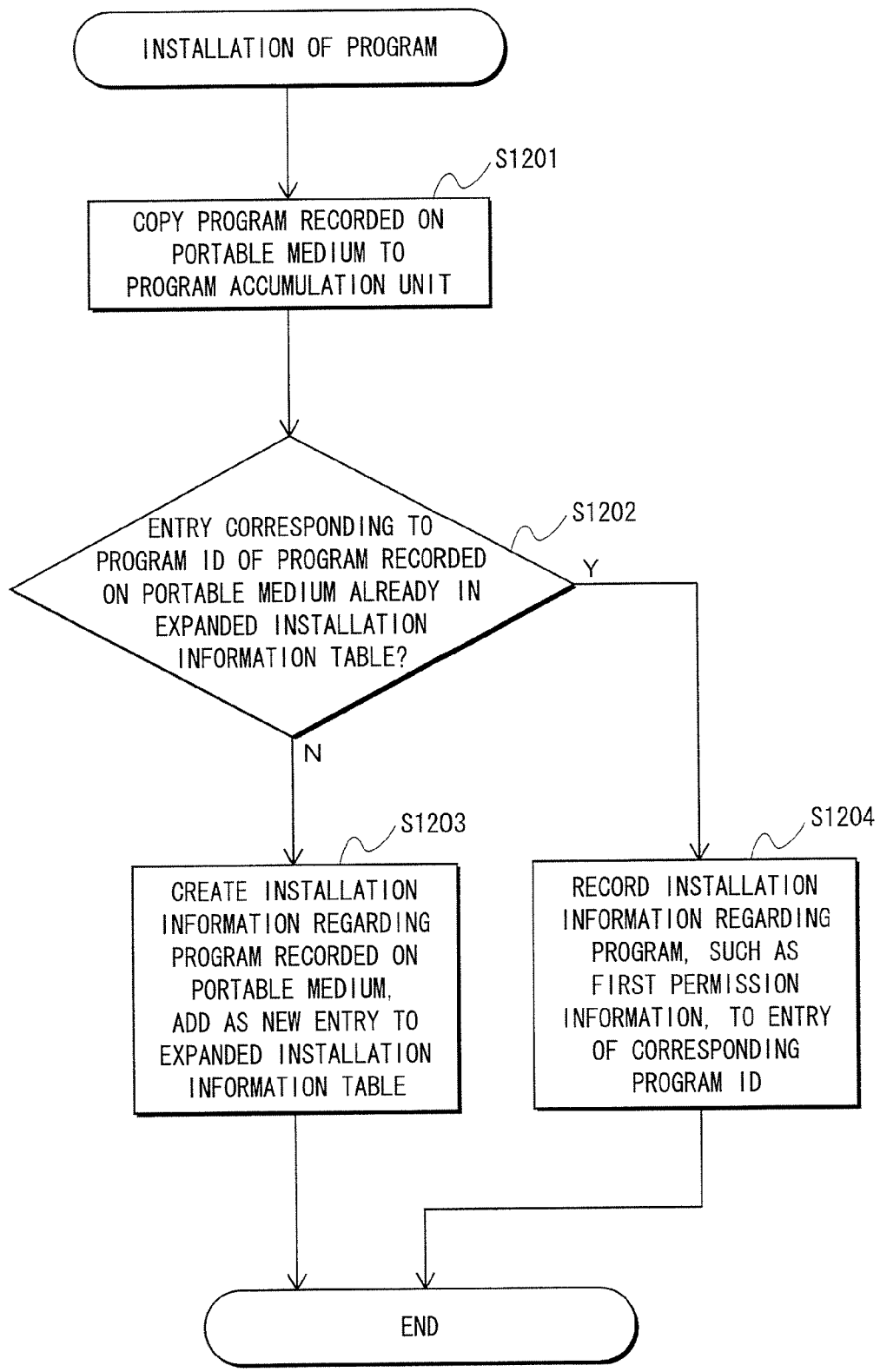
FIG. 12 shows installation processing of a program of embodiment 3.

FIG. 12 shows a flow of processing for program installation.

Program installation is executed by the installation unit 104 when the portable medium 120 is inserted into the device 100 and there has been an installation instruction from the user. Installation can be realized by, for example, questioning the user using the device 100 whether to install the program to the device 100, and obtaining a result regarding the answer. Alternatively, installation may be realized by a method other than questioning the user, such as providing the installation unit 104 with information regarding the available capacity of the long-term storage apparatus in the device, and automatically performing copy processing if there is enough available capacity to accumulate the program.

The installation unit 104 copies, to the program accumulation unit 101, the program 121 recorded on the portable medium 120 inserted into the device 100 (S1201).

The program accumulation unit 101 holds information regarding the usable capacity of the long-term storage apparatus of the device. For example, installation is not possible and processing ends if there is a problem in the execution of the copy processing, such as an insufficient amount of available capacity in the long-term storage apparatus.

Note that if the portable medium 120 is rewritable, the program may be erased from the portable medium 120 as the program copy processing is being performed (i.e., the program is moved).

In S1202, the installation unit 104 refers to the expanded installation information table 117 to check whether there is an entry corresponding to the program 121. The existence of an entry indicates that additional program information associated with the program 121 has previously been installed.

The processing of S1203 is performed if it is judged in S1202 that there is not an entry associated with the program 121. In S1203, installation information, which is management information regarding the copied program, is newly created and added as an entry to the expanded installation information table 117. The installation information created here includes a file name of the program, the first permission information of the corresponding program, a program ID, a portable medium ID (arbitrary in the present embodiment), and the like. Details of the above information are mentioned later in the description of the expanded installation information table 117.

The processing of S1204 is performed if it is judged in S1202 that there is an entry associated with the program 121.

In S1204, installation information, which is management information regarding the copied program, is added to the existing corresponding entry.

Figure 13:
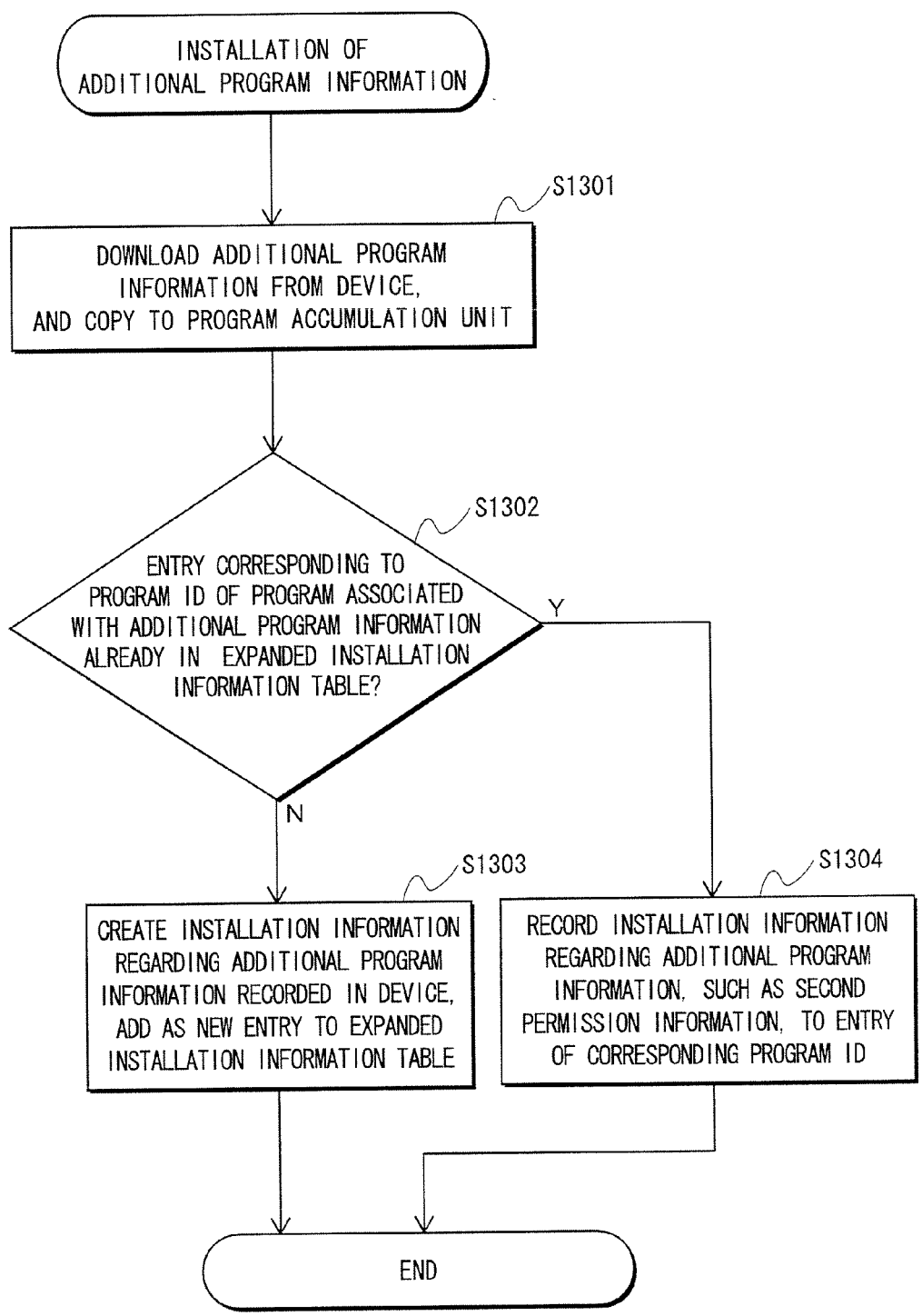
FIG. 13 shows installation processing of additional program information of embodiment 3.

FIG. 13 shows a flow of processing for installing additional program information.

Installation of additional program information is executed by the installation unit 104 when the device 100 and the device 130 are connected and there has been an installation instruction from the user. Installation can be realized by, for example, questioning the user using the device 100 whether to install the additional program information to the device 100, and obtaining a result regarding the answer. Alternatively, installation may be realized by a method other than questioning the user, such as providing the installation unit 104 with information regarding the available capacity of the long-term storage apparatus in the device, and automatically performing copy processing if there is enough available capacity to accumulate the additional program information.

The installation unit 104 copies, to the program accumulation unit 101, the additional program information 131 recorded on the device 130 connected to the device 100 (S1301).

The installation unit 104 holds information regarding the usable capacity of the long-term storage apparatus of the device. For example, installation is not possible and processing ends if there is a problem in the execution of the copy processing, such as an insufficient amount of available capacity in the long-term storage apparatus.

In S1302, the installation unit 104 refers to the expanded installation information table 117 to check whether there is an entry corresponding to the program 121 associated with the additional program information 131. The existence of an entry indicates that the program 121 has previously been installed.

The processing of S1303 is performed if it is judged in S1302 that there is not an entry corresponding to the program 121. In S1303, installation information, which is management information regarding the additional program information, is newly created and added as an entry to the expanded installation information table 117. The installation information created here includes the additional program information, the second permission information of the corresponding program, an additional program information ID, a device ID, and the like. Details of the above information are mentioned later in the description of the expanded installation information table 117.

The processing of S1304 is performed if it is judged in S1302 that there is an entry corresponding to the program 121. In S1304, installation information, which is management information regarding the additional program information, is added to the existing corresponding entry.

FIG. 11 shows an example of the expanded installation information table 117.

The expanded installation information table 117 is provided with item fields, which are a program field 1171, a first permission information field 1172, a second permission information field 1173, a program ID field 1174, a portable medium ID 1175, an additional program information field 1176, an additional program information ID field 1177, and a device ID field 1178.

Information for specifying the targeted program is recorded in the program field 1171. Such information is, for example, a file name in a file system of the program accumulation unit 101.

Information for specifying permission information associated with the program is recorded in the first permission information field 1172 and the second permission information field 1173. Such information is, for example, a file name of the permission information in the file system of the program accumulation unit 101.

For example, the permission file name "prog1A.prf" in the first permission information field 1172 is attached with the identification information "diskonly", and is used if executing the program without using the additional program information 116. Also for example, the permission file name "prog1B.prf" in the second permission information field 1173 is attached with the identification information "addition", and is used if executing the program using the additional program information 116.

Identification information for identifying the program 121 recorded on the portable medium 120 is recorded in the program ID field 1174. The program ID information may be recorded when the program is installed to the program accumulation unit 101 from the portable medium 120, or held as information pertaining to the program with which the additional program information 131 is associated and recorded when the additional program information 131 is installed to the program accumulation unit 101.

Identification information for identifying the copy-source portable medium 120 is recorded in the portable medium ID field 1175. Such identification information is, for example, a serial number individually held by the portable medium 120. The portable medium ID information need not exist in the present embodiment.

Information for specifying the targeted additional program information is recorded in the additional program information field 1176. Such information is, for example, a file name in the file system of the program accumulation unit 101.

Information for identifying the additional program information is recorded in the additional program information ID field 1177. The additional program information ID field need not exist, depending on the embodiment.

Identification information for identifying the copy-source device 130 is recorded in the device ID field 1178. Such identification information may be, for example, a serial number individually held by the device 130, or position information, such as an IP address or URL, for specifying a device by data communication. The device ID field need not exist, depending on the embodiment.

Next is a description of operations performed when executing the program, with reference to FIG. 14.

The selection unit 106 questions the user whether to execute the program using the additional program information (S1401) The selection unit 106 also questions the user whether to execute the program installed to the program accumulation unit 101 or the program recorded on the portable medium 120 (S1405). Processing for executing the program is performed using the results of S1401 and S1405.

If execution of the program using the additional program information has been selected in S1401, the permission setting unit 108 sets the second permission information as the permission information to be used when executing the program (S1402). Furthermore, the selection unit 106 reads the additional program information from the program accumulation unit, and writes the read additional program information to the main memory of the program execution unit.

The following describes an implementation for executing the program 121 or 102, a function of which has been added or updated using the additional program information 116.

If the program execution unit 107 is realized by a JAVA™ virtual machine, the program with an added or updated function can be executed by writing a JAR-formatted file corresponding to the additional program information 116 and a JAR-formatted file corresponding to the program 121 or 102 to the JAVA™ virtual machine.

If the additional program information 116 includes a separate program which is to replace part or an entirety of the program 121 or 102, all of the information of the program 121 or 102 need not be written in the subsequent writing to the main memory (S1406 or S1407), but rather, it may be sufficient to write part of information of the program 121 or 102.

The selection unit 106 includes a function for comparing file names and a function for detecting a time stamp of a file, in order to detect a file to be replaced.

The selection unit 106 compares all of the files included in the JAR file corresponding to the additional program information 116 and all of the files included in the JAR file corresponding to the program 121 (program 102), and compares the time stamps of files detected to have the same file name. This results in an implementation in which only files considered to be newer are written to the main memory of the program execution unit 107, and files determined to be old are not written to the main memory.

Also, a proper order relation may be specified for writing of the program and the additional program information to the main memory. In such a case, S1403 may be performed after S1406.

In S1405, the selection unit 106 questions the user whether to execute the program 121 installed to the program accumulation unit 101 or the program 102 recorded on the portable medium 120.

In the case of the former, part or an entirety of the program 121 installed to the program accumulation unit 101 is written to the main memory of the program execution unit 107, and the program is executed (S1406).

In the case of the latter, part or an entirety of the program 102 recorded on the portable medium 120 is written to the main memory of the program execution unit 107, and the program is executed (S1407).

This completes the description of the flow of processing performed when executing the program.

Embodiment 4

A structure of embodiment 4 is the same as the structure of embodiment 3.

The following describes a program of the present embodiment.

The program may be, but should not be limited to, an application program such as a game that can receive user input to be played. The program recorded on the portable medium 120 includes only the first permission information 123A. The following two functions are set in the first permission information 123A.

(Permission item 1) Reading and writing of data (e.g., data regarding score information during game play) from/to the long-term storage apparatus (storage) of the device is permitted.

(Permission item 2) A network access function for accessing a URL of a server site managed by the game application developer.

The first permission information prohibits the use of the functions of permission item 1, and allows the use of permission item 2. The present program can be executed on an optical disc playback device that includes a program execution environment. Here, the program is executed directly from the portable medium, without being installed to the program accumulation unit 101 of the optical disc playback device.

Also, additional program information is provided from a server managed by the game application developer and that the optical disc playback device can connect to. The installation unit 104 acquires additional information from the server, and installs the acquired additional information to the program accumulation unit 101.

The additional program information is assumed to include an updated version of the program and second permission information.

Also, the use of both of the above two permission items is assumed to be permitted in the second permission information.

If execution of the program using the additional program information has not been selected, only the program recorded on the portable medium is written to the program execution unit. In this case, the functions of the program are permitted within the range established in the first permission information. In other words, the program cannot perform operations for reading or writing data to the long-term storage apparatus (storage) of the device, as specified in permission item 1. In this case, only the a program and data recorded on the portable medium are used, and the program is executed the same as if no information has been obtained from a network.

If execution of the program using the additional program information has been selected, the additional program information installed to the program accumulation unit 101 and the program recorded on the portable medium are written to the program execution unit.

Given that the additional program information includes an updated version of the program, it is possible for the updated version of the program and the original program recorded on the portable medium to have the same files and information. Here, the files as well as the information may be compared and selectively written to the program accumulation unit. In other words, all of the data of both the additional program information and the program recorded on the portable medium need not be written to the program execution unit, but rather, portions judged to not be necessary to execution of the program, such as files the same as those of the updated version of the program, may not be written.

In this case, the functions of the program are permitted within the range established in the second permission information. In other words, the program can perform operations for reading or writing data to the long-term storage apparatus (storage) of the device, as specified in permission item 1. In this case, the program recorded on the recording medium and additional program information provided by a server via a network are used, and it is possible to execute a new program based on new permission information.

INDUSTRIAL APPLICABILITY

The present invention can be used as access protection and access management technology for security by appropriately controlling operations of a program. A program (content) developer can apply the present invention as copyright management and copyrighted works distribution management technology for providing an appropriate range of services according to an acquisition route of a user's program.

The invention claimed is:

1. A program execution device that acquires and executes a program attached with access permission information indicating an access right to a resource during execution of the program, the program execution device comprising:

a permission information setter operable to set, according to an acquisition route of the program, first permission information included in the access permission information or second permission information that differs from the first permission information;

an executor operable to execute the program in accordance with the first permission information or with the second permission information set by the permission information setter;

a recording medium mount operable to have mounted therein a portable recording medium on which the program is recorded; and a program storage operable to copy and store the program and the access permission information recorded on the mounted portable recording medium, wherein the permission information setter includes a first subsetter operable to set the first permission information when the program is read from the portable recording medium mounted in the recording medium mount; and a second subsetter operable to set the second permission information when the program is read from the program storage.

2. The program execution device of claim 1, wherein the first permission information and the second permission information are included in the access permission information recorded on the portable recording medium, the first permission information and the second permission information are stored along with the program in the program storage, the first subsetter sets the first permission information recorded on the portable recording medium, and the second subsetter sets the second permission information recorded in the program storage.

3. The program execution device of claim 1, wherein the first permission information is included in the access permission information recorded on the portable recording medium, and the program executor device further comprises:

a convertor operable to convert the first permission information to the second permission information in accordance with a conversion rule.

4. The program execution device of claim 1, further comprising:

a detector operable to detect that the portable recording medium is mounted in the recording medium mounting, wherein the permission information setter sets the first permission information regardless of acquisition route of the program, when the detector detects that the portable recording medium is mounted in the recording medium mount.

5. The program execution device of claim 1, further comprising:

an acquirer operable to acquire additional program information that is associated with the program, wherein the additional program information includes the second permission information and an additional program for adding or updating a function of the program, and the permission information setter sets the second permission information when the acquisition route is via the acquirer.

6. The program execution device of claim 5, wherein the acquirer includes a downloader operable to download the additional program information from an external server via a communication line; and an adder operable to store the downloaded additional program information in the program storage.

7. A program execution method for a program execution device that acquires and executes a program attached with access permission information indicating an access right to a resource during execution of the program, the program execution device including a recording medium mount operable to have mounted therein a portable recording medium on which the program is recorded, and a program storage operable to copy and store the program and the access permission information recorded on the mounted portable recording medium, the program execution method comprising:

setting, according to an acquisition route of the program, first permission information included in the access permission information or second permission information that differs from the first permission information; and executing the program in accordance with the first permission information or the second permission information set by the setting;

wherein the setting comprises setting the first permission information when the program is read from the portable recording medium mounted in the recording medium mount, and a setting the second permission information when the program is read from the program storage.

8. The program execution method of claim 7, wherein the first permission information and the second permission information are included in the access permission information recorded on the portable recording medium, the first permission information and the second permission information are stored along with the program in the program storage, setting the first permission information includes setting the first permission information recorded on the portable recording medium, and setting the second permission information includes setting the second permission information recorded in the program storage.

9. The program execution method of claim 7, wherein the first permission information is included in the access permission information recorded on the portable recording medium, and the executing comprises converting the first permission information to the second permission information in accordance with a conversion rule.

10. The program execution method of claim 7, further comprising:

detecting that the portable recording medium is mounted in the recording medium mount, wherein the setting sets the first permission information, regardless of acquisition route of the program, when the detecting detects that the portable recording medium is mounted in the recording medium mount.

11. The program execution method of claim 7, further comprising:

acquiring additional program information that is associated with the program, wherein the additional program information includes the second permission information and an additional program for adding or updating a function of the program, and the setting sets the second permission information when the acquisition route is via the acquirer.

12. The program execution method of claim 11, wherein the acquiring comprises:

downloading the additional program information from an external server via a communication line; and setting the downloaded additional program information in the program storage.

* * * * *